United States Patent [19]

Fujii et al.

[11] Patent Number: 5,684,698
[45] Date of Patent: Nov. 4, 1997

[54] VEHICLE ATTITUDE AND AVERAGE HEIGHT CONTROL APPARATUS

[75] Inventors: Kazushi Fujii; Hisashi Kuriya; Kazuo Ishikawa; Yoshitaka Kouketsu, all of Kariya; Shunichi Shibasaki, Toyota, all of Japan

[73] Assignee: Kabushiki Kaisha Toyoda Jidoshokki Seisakusho, Kariya, Japan

[21] Appl. No.: 422,328

[22] Filed: Apr. 13, 1995

[30] Foreign Application Priority Data

Apr. 15, 1994 [JP] Japan ................................. 6-077576
Apr. 15, 1994 [JP] Japan ................................. 6-077577

[51] Int. Cl.⁶ .................................................. B60G 17/00
[52] U.S. Cl. .......................... 364/424.047; 364/424.046; 280/840; 280/6.1; 280/6.11; 180/41
[58] Field of Search ................ 364/424.05, 424.045, 364/424.047; 280/707, 840, 6.1, 6.11; 180/41; 188/299

[56] References Cited

U.S. PATENT DOCUMENTS

| | | | |
|---|---|---|---|
| 4,603,881 | 8/1986 | Mikina | 280/675 |
| 4,803,630 | 2/1989 | Takizawa et al. | 364/424.05 |
| 4,953,890 | 9/1990 | Kamimura | 280/707 |
| 5,053,965 | 10/1991 | Fujimura et al. | 364/424.05 |
| 5,058,017 | 10/1991 | Adachi et al. | 364/424.05 |
| 5,130,927 | 7/1992 | Kunishima et al. | 364/424.05 |
| 5,141,245 | 8/1992 | Kamimura et al. | 280/707 |
| 5,144,558 | 9/1992 | Fukushima et al. | 364/424.05 |
| 5,159,837 | 11/1992 | Wada | 73/602 |
| 5,162,996 | 11/1992 | Matsumoto et al. | 364/424.05 |

FOREIGN PATENT DOCUMENTS

| | | |
|---|---|---|
| 1-122716 | 5/1989 | Japan. |
| 2-60810 | 3/1990 | Japan. |
| 2-182522 | 7/1990 | Japan. |
| 5-164245 | 6/1993 | Japan. |

OTHER PUBLICATIONS

A report from Mechanics Research Report, entitled "Active Suspension Robot for Rough Terrain", Tani et al., vol. 46, No. 2, pp. 139–155 (1992).

Primary Examiner—Kevin J. Teska
Assistant Examiner—Tan Nguyen
Attorney, Agent, or Firm—Brooks Haidt Haffner & Delahunty

[57] ABSTRACT

An attitude control apparatus, for a vehicle having a body and a plurality of wheels, has an actuator operated by a fluid for expanding each suspension of the vehicle to control the stroke of each wheel. A first detecting device detects a variation of incline of the body of the vehicle when the body inclines from a horizontal position. A second detecting device detects the vertical position of each wheel relative to the body. A third detecting device detects the load applied to each wheel. A first control device controls the volume and direction of the fluid to be supplied to the actuator. A calculating device calculates the vertical displacement of each wheel, the current average height of the body, and the variation of the load on the wheel based on the variation of the inclined angle of the body, the vertical position of each wheel, and the load on each wheel. A setting device sets a target value for the average height. A second control device controls the actuator via the first control device in response to results calculated by the calculating device to cause the current average height to approach the target value and to cause the variation of the load on each wheel to approach substantially zero.

19 Claims, 17 Drawing Sheets

VEHICLE ATTITUDE AND AVERAGE HEIGHT CONTROL APPARATUS

BACKGROUND OF THE INVENTION

1. Field of the Invention

The present invention relates to a vehicle attitude control apparatus which keeps a vehicle in a horizontal state when the vehicle runs on rough or sloped ground or in rivers. More particularly, this invention relates to an apparatus which connects the individual wheels to the vehicle's body via hydraulic actuators and controls the strokes of the individual wheels with the hydraulic actuators to control the vehicle's state.

2. Description of the Related Art

Japanese Unexamined Patent Publication No. 2-60810 discloses a vehicle attitude control apparatus. This apparatus detects the pitch amount, roll amount and lift amount, respectively, based on a change in the vehicle's height, and performs feedback control to set the difference between the detected values and their target values to zero. The pitch amount, roll amount and lift amount are three components of the variation in the vehicle's state.

This apparatus has stroke sensors for detecting the vertical positions or stroke amounts of the individual wheels, and acquires the pitch amount, roll amount and lift amount from the following equations based on the strokes detected by the stroke sensors.

$$\text{pitch amount} = \text{average stroke amount of two front wheels} - \text{average stroke amount of two rear wheels} \quad (A)$$

$$\text{roll amount} = \text{average stroke amount of two right wheels} - \text{average stroke amount of two left wheels} \quad (B)$$

$$\text{lift amount} = \text{average stroke amount of four wheels} \quad (C)$$

The target stroke amounts for the individual wheels are input to a target amount converter from a unit for setting the target vehicle height, and the target pitch amount, the target roll amount and the target lift amount are computed by performing calculations similar to the equations (A) to (C). Then, the differences between the target amounts and the associated detected amounts are computed, and feedback control is performed on the fluid pressures of the hydraulic actuators for the four wheels.

The report "Active Suspension Robot Which Runs Off-road" in Mechanics Research Report Vol. 46 (1992) No. 2, infra page 139 proposes a wheel type robot capable of operating in disaster areas, fields or the like due to the use of active suspensions for suppressing the up-and-down movement of a vehicle caused by the rough road surfaces. This robot has suspension systems for independently supporting four wheels in a drivable and elevatable manner, angular velocity sensors and inclination angle sensors. The robot computes the roll angle and pitch angle from the inclination of the real plane from an imaginary horizontal plane based on the information from the angular velocity sensors and inclination angle sensors, and retracts or protracts the suspension systems in accordance with those angles to set the inclination of the imaginary horizontal plane to zero, thereby accomplishing the state control.

The conventional control apparatus disclosed in Japanese Unexamined Patent Publication No. Hei 2-60810 performs feedback control based on the pitch amount, roll amount and lift amount (heave amount) obtained from the stroke amounts of the individual wheels. Those pitch amount and roll amount are not the values with respect to the absolute horizontal plane. Those values are therefore unsuitable for the state control on mountain roads or rough roads.

The apparatus described in the report in the Mechanics Research performs the state control to set the inclination of the imaginary horizontal plane to zero, but performs no control to shift the imaginary horizontal plane in the vertical direction (control of a change in the translational direction). That is, this apparatus does not control the average vehicle height. The average vehicle height may therefore become too low on a sharp slope so that there is a possibility that the apparatus may contact the slope. This apparatus is therefore unsuitable. When one wheel is lifted up, the control becomes inadequate.

SUMMARY OF THE INVENTION

Accordingly, it is a primary objective of the present invention to provide a vehicle attitude control apparatus which has an improved function to keep a vehicle's body horizontal when the vehicle is running off-road.

It is a secondary objective to provide a vehicle attitude control apparatus capable of automatically changing the average vehicle height to the level that allows the vehicle to go over an obstruction.

It is a third objective to provide a vehicle attitude control apparatus capable of controlling the inclination of a vehicle to a slightly inclined state from the horizontal state in accordance with the road conditions.

To achieve the foregoing and other objects and in accordance with the purpose of the present invention, there is provided an attitude control apparatus for a vehicle. The vehicle has a body with a plurality of wheels supported by the associated suspensions and an actuator operated by a fluid for expanding each suspension to control the stroke of each wheel. The first detecting device detects variation of inclined angle of the body when the body inclines from a horizontal position of the body. The second detecting device detects a vertical position of each wheel relative to the body. The third detecting device detects a load applied to each wheel. The first control device controls a volume and a direction of the fluid to be supplied to the actuator. A calculating device calculates a vertical displacement of each wheel, a current average height of the body, and the variation of the load of the wheel based on the variation of the inclined angle of the body, the vertical position of each wheel, and the load of each wheel. A setting device sets a target value of the average height. The second control device controls the actuator via the first control device in response to results calculated by the calculating device to approach the current average height to the target value and to approach the variation of the load of each wheel to substantially zero.

BRIEF DESCRIPTION OF THE DRAWINGS

The features of the present invention that are believed to be novel are set forth with particularity in the appended claims.

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention, as adapted for a vehicle which drives four wheels by hydraulic motors, will now be described with reference to FIGS. 1 through 9.

Figure 2:
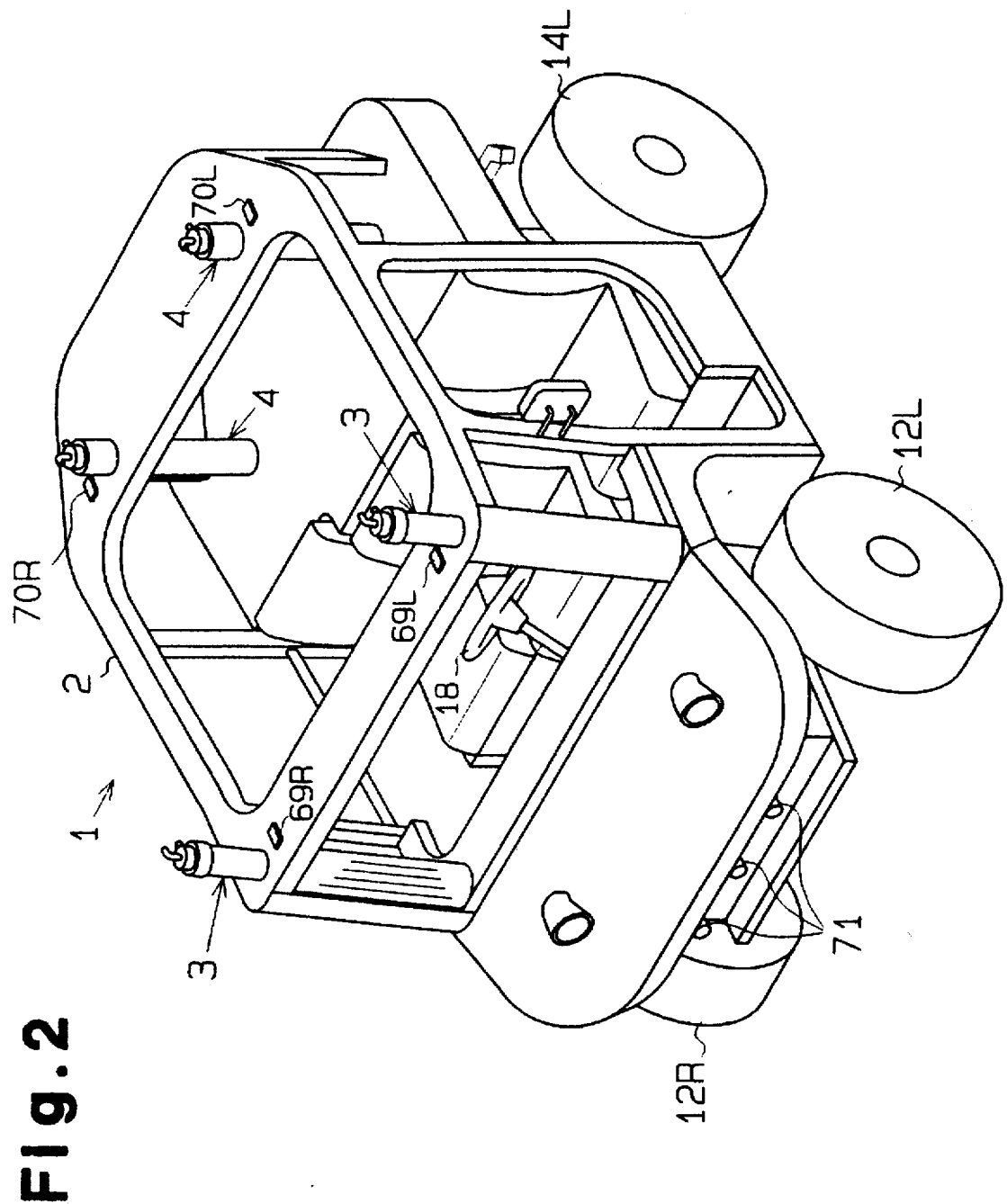
FIG. 2 is a schematic perspective view of a vehicle according to the first embodiment.
Figure 3:
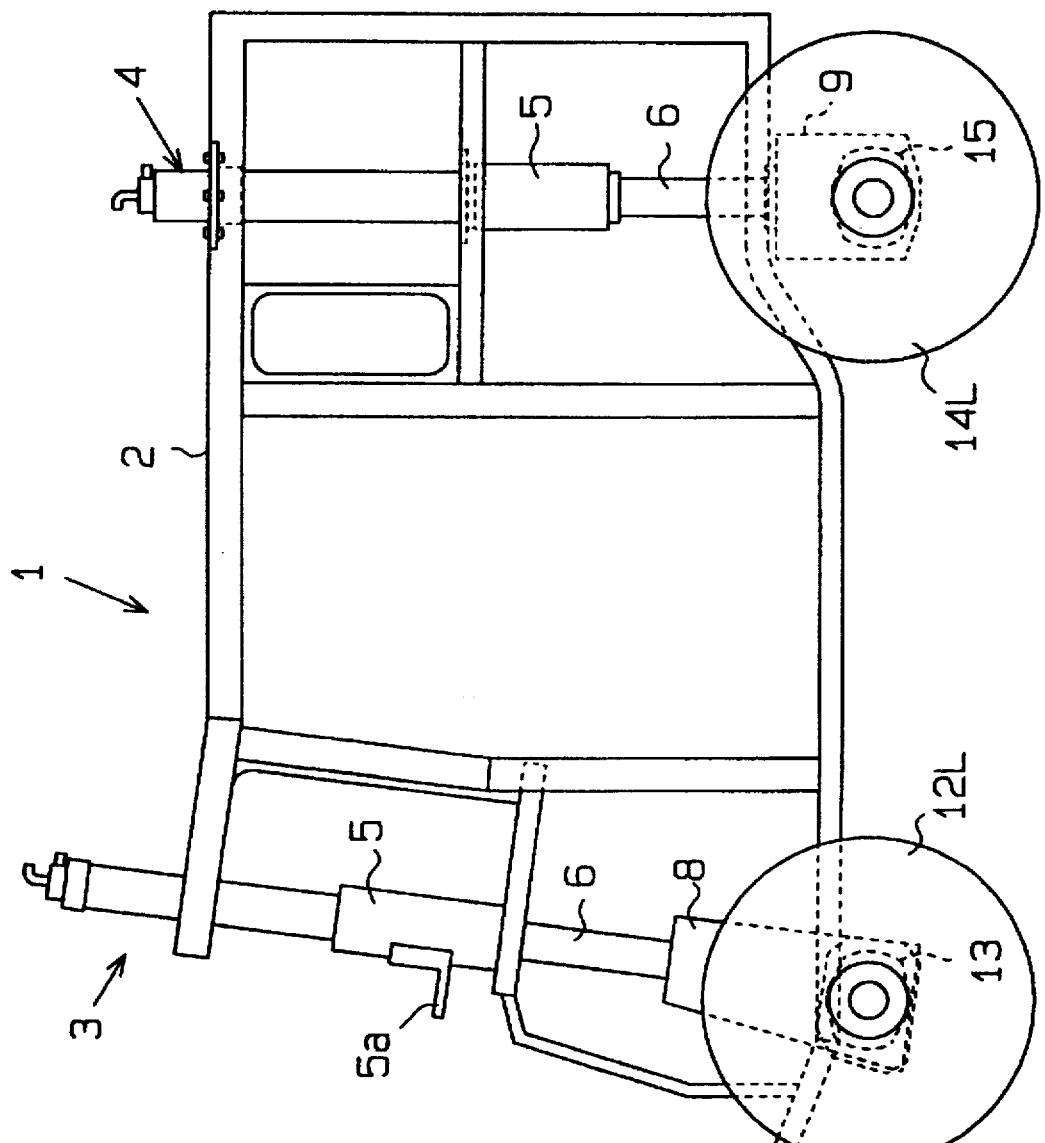
FIG. 3 is a schematic side view showing the arrangement of suspension systems in the first embodiment.

As shown in FIGS. 2 and 3, a pair of front suspension systems 3 are provided on the front side of a body frame 2 of a vehicle 1, and a pair of rear suspension systems 4 are provided on the rear side. Each of the suspension systems 3 and 4 includes an outer cylinder 5, an inner cylinder 6 and a hydraulic actuator or hydraulic cylinder 7 (see FIGS. 5A and 6). The inner cylinder 6 is movable along the axis of the outer cylinder 5 in an unrotatable manner via, for example, a ball spline (not shown). The outer cylinder 5 is supported on the body frame 2, and support brackets 8 and 9 are secured to the lower end of each inner cylinder 6. The outer cylinder 5 of the front suspension system 3 is rotatably supported on the body frame 2 via bearings 10 and 11. The outer cylinder 5 of the rear suspension system 4 is supported in an unrotatable manner on the body frame 2.

Figure 4A:
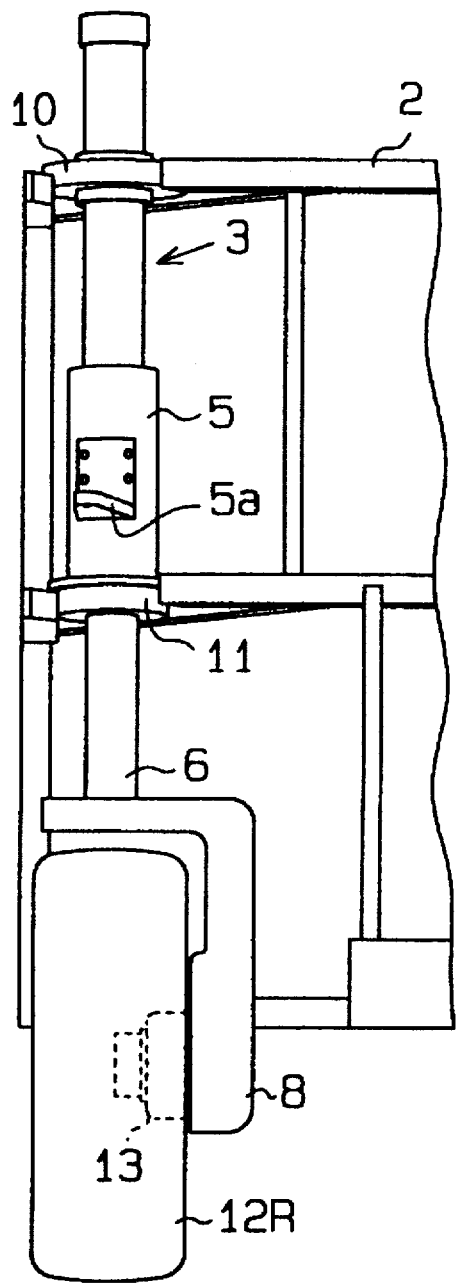
FIG. 4A is a schematic front view showing the attachment of the suspension system for the right front wheel.
Figure 4B:
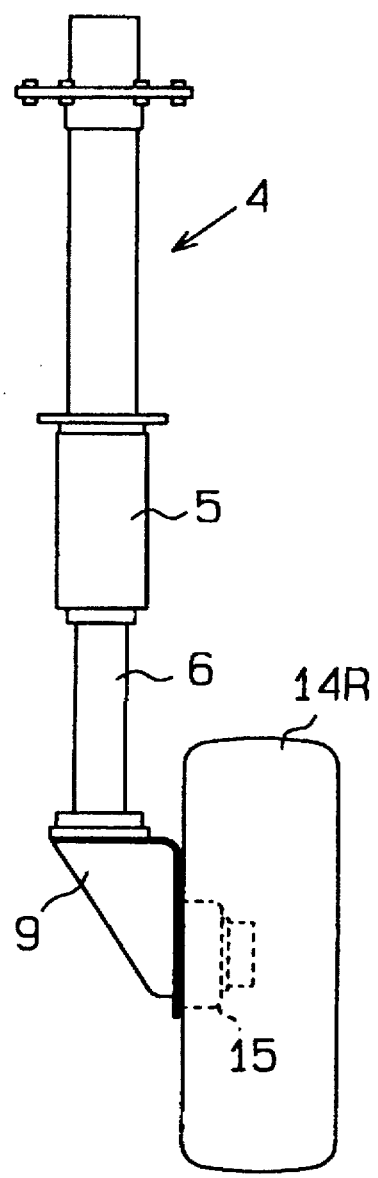
FIG. 4B is a schematic back view showing the attachment of the suspension system for the right rear wheel.

Front wheels 12L and 12R and hydraulic motors 13 for driving front wheels 12L and 12R are supported on the support brackets 8, respectively. Rear wheels 14L and 14R and hydraulic motors 15 for driving rear wheels 14L and 14R are supported on the support brackets 9, respectively. As shown in FIG. 4A, the hydraulic motor 13 is positioned in the associated front wheel 12L or 12R (only the right wheel (12R) side shown in FIG. 4A). As shown in FIG. 4B, the hydraulic motor 15 is positioned in the associated rear wheel 14L or 14R (only the right wheel (14R) side shown in FIG. 4B). The front wheels 12L and 12R and the rear wheels 14L and 14R are coupled to the drive shafts of the associated hydraulic motors 13 and 15 so as to be rotatable together with the associated drive shafts.

Figure 5A:
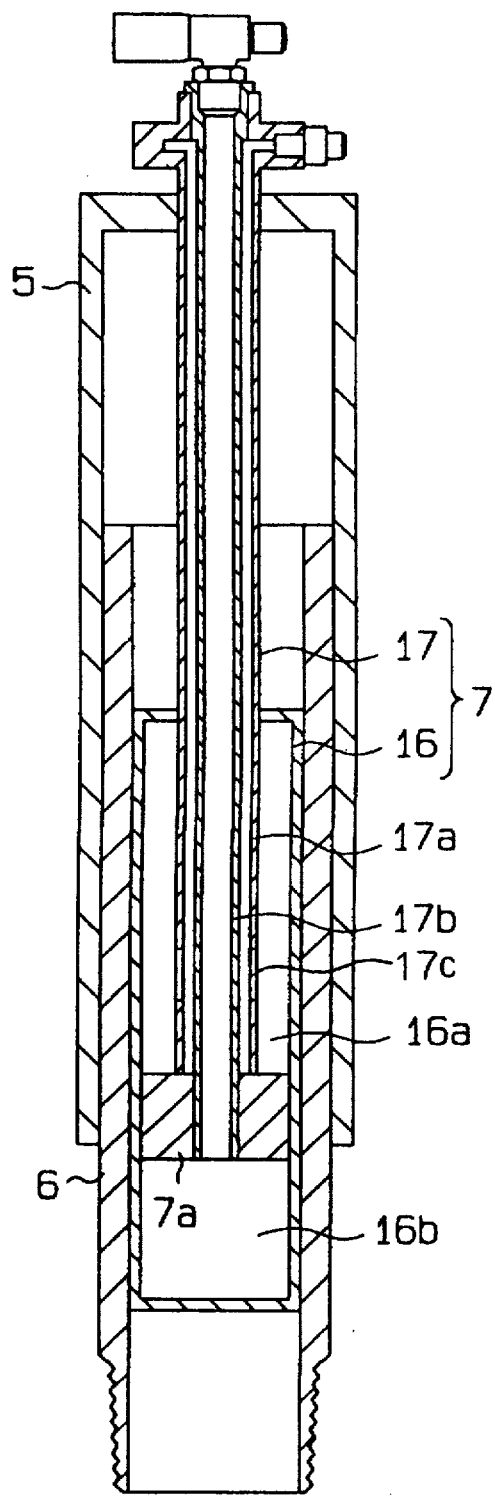
FIG. 5A is an exemplary diagram of a hydraulic cylinder of the suspension system.

FIG. 5A is an exemplary diagram showing the structure of the hydraulic cylinder 7. As shown in FIG. 5A, a cylinder body 16 is secured in the inner cylinder 6 of the hydraulic cylinder 7 and the distal or upper end of a rod 17 is secured to the outer cylinder 5. The rod 17 has a double pipe structure with an outer pipe 17a connected via a hole 17c to a chamber 16a located above a partition 7a. An inner pipe 17b is connected to a chamber 16b located below the partition 7a.

When an operation fluid is supplied to the outer pipe 17a, the inner cylinder 6 moves upward together with the cylinder body 16. When an operation fluid is supplied to the inner pipe 17b, the inner cylinder 6 moves downward together with the cylinder body 16. Each individual suspension system 3 and 4 is provided with stroke sensors 19L, 19R, 20L and 20R, respectively, (shown in FIG. 6) which detect the vertical positions of the front wheels 12L and 12R and the rear wheels 14L and 14R. The stroke sensors 19L, 19R, 20L and 20R are incorporated in the associated hydraulic cylinders 7. Each sensor produces detection signals corresponding to the length of the associated hydraulic cylinder 7. That is, each sensor sends a signal corresponding to the relative position of its associated wheel with respect to the body frame 2.

The outer cylinders 5 of both front suspension systems 3 are coupled via handling links 5a (shown in FIG. 4A) to the power steering system (not shown), and the directing angles of the front wheels 12L and 12R are changed by the manipulation of a steering wheel 18.

Figure 6:
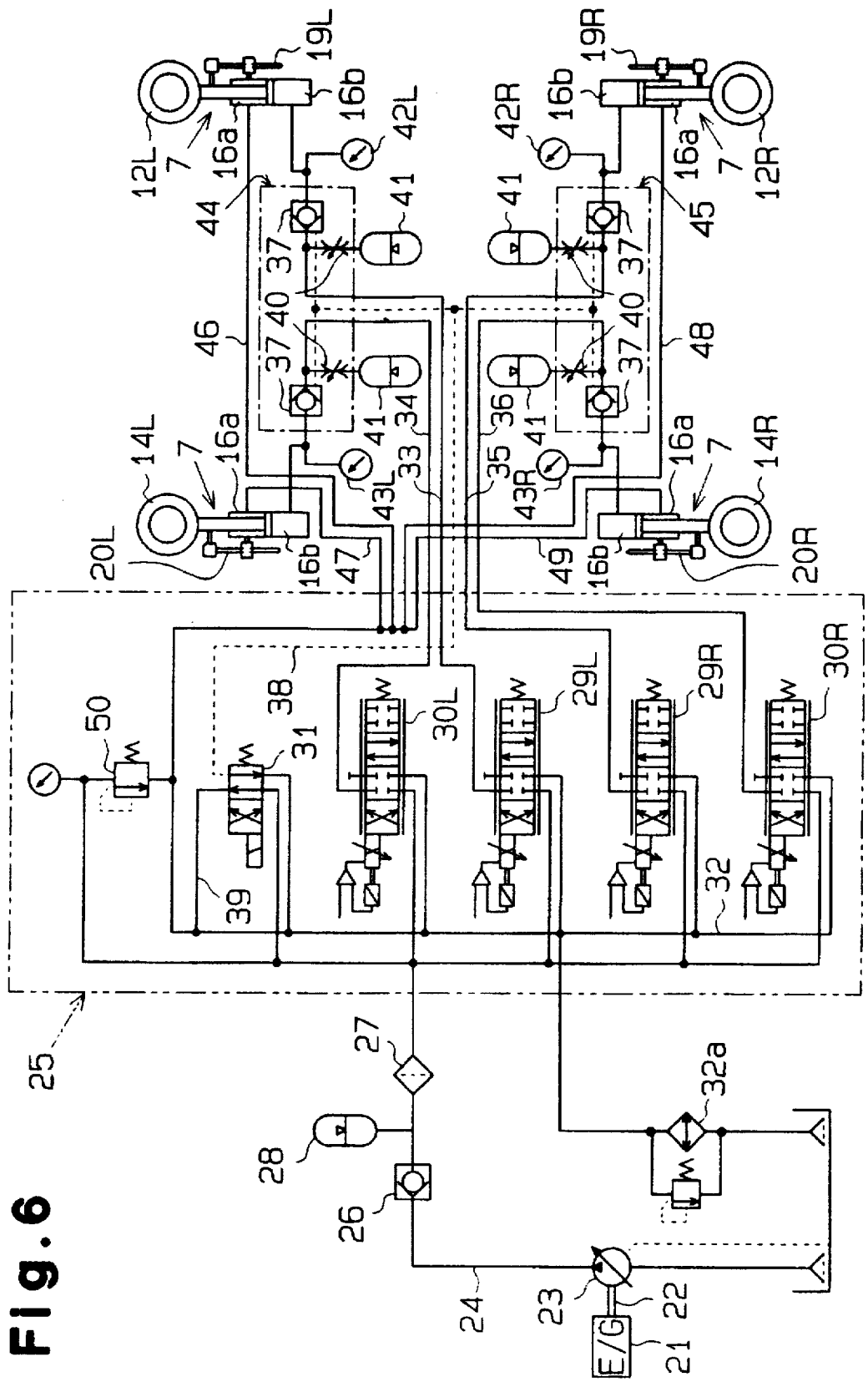
FIG. 6 is a hydraulic circuit diagram of a state control apparatus.

The hydraulic circuit of this embodiment will now be discussed with reference to FIG. 6. A hydraulic pump 23 for a state control is coupled to a drive shaft 22 of an engine 21. To supply an operation fluid to the hydraulic circuit for driving the hydraulic motors 13 and 15, a variable displacement pump and a charge pump (not shown) are coupled to the drive shaft 22, and a hydraulic pump for power steering (not shown) is also coupled to this drive shaft 22. A swash plate type variable displacement hydraulic pump is used as the hydraulic pump 23. The hydraulic pump 23 is connected via a main pipe 24 to a main manifold 25.

A main check valve 26 and a line filter 27 are provided in the main pipe 24, with a main accumulator 28 connected midway between the main check valve 26 and the line filter 27. The main manifold 25 is provided with four servo valves 29L, 29R, 30L and 30R and one cutoff valve 31 for driving and controlling the hydraulic cylinders 7 of the individual suspension systems 3 and 4. The opening of each servo valve is controlled in proportion to an instruction voltage so that the flow rate of the operation fluid can be continuously controlled. The supply ports of the individual servo valves 29L, 29R, 30L and 30R are connected to the main pipe 24, and tank ports are connected to a drain pipe 32. The drain pipe 32 is provided with an oil cooler 32a.

The servo valve 29L is connected via a pipe 33 to the chamber 16b of the hydraulic cylinder 7 of the left front wheel 12L, and the servo valve 30L is connected via a pipe 34 to the chamber 16b of the hydraulic cylinder 7 of the left rear wheel 14L. The servo valve 29R is connected via a pipe 35 to the chamber 16b of the hydraulic cylinder 7 of the right front wheel 12R, and the servo valve 30R is connected via a pipe 36 to the chamber 16b of the hydraulic cylinder 7 of the right rear wheel 14R. Pilot operation check valves 37 are respectively provided in the pipes 33 to 36 to always permit the operation fluid to pass toward the hydraulic cylinders 7. A 4-port, 2-position electromagnetic valve is used as the cutoff valve 31. The cutoff valve 31 is connected via a pipe 38 to the pilot port of each pilot operation check valve 37, and is connected via a pipe 39 to the drain pipe 32.

An accumulator 41 is connected via a restriction 40 between each servo valve 29L, 29R, 30L or 30R and each pilot operation check valve 37. The accumulator is of a diaphragm type. Pressure sensors 42L, 42R, 43L and 43R are respectively connected between the hydraulic cylinders 7 and the pilot operation check valves 37. The pressure sensors 42L, 42R, 43L and 43R detect pressures in the chambers 16b of the associated hydraulic cylinders 7 or values corresponding to the loads from the individual wheels acting on the hydraulic cylinders 7, and produce detection signals corresponding to the values. The two pilot operation check valves 37 and two restrictions 40 for the hydraulic cylinders 7 for elevating the left wheels constitute a single sub manifold 44, and the two pilot operation check valves 37 and two restrictions 40 for the hydraulic cylinders 7 for elevating the right wheels constitute a single sub manifold 45.

The chamber 16a of the hydraulic cylinder 7 of the left front wheel 12L is connected via a pipe 46 to the drain pipe 32, and the chamber 16a of the hydraulic cylinder 7 of the left rear wheel 14L is connected via a pipe 47 to the drain pipe 32. The chamber 16a of the hydraulic cylinder 7 of the right front wheel 12R is connected via a pipe 48 to the drain pipe 32, and the chamber 16a of the hydraulic cylinder 7 of the right rear wheel 14R is connected via a pipe 49 to the drain pipe 32. A relief valve 50 is connected between the main pipe 24 and the drain pipe 32. The relief valve 50 connects the main pipe 24 to the drain pipe 32 when the pressure of the operation fluid pumped out from the hydraulic pump 23 becomes greater than a predetermined pressure.

Figure 1A:
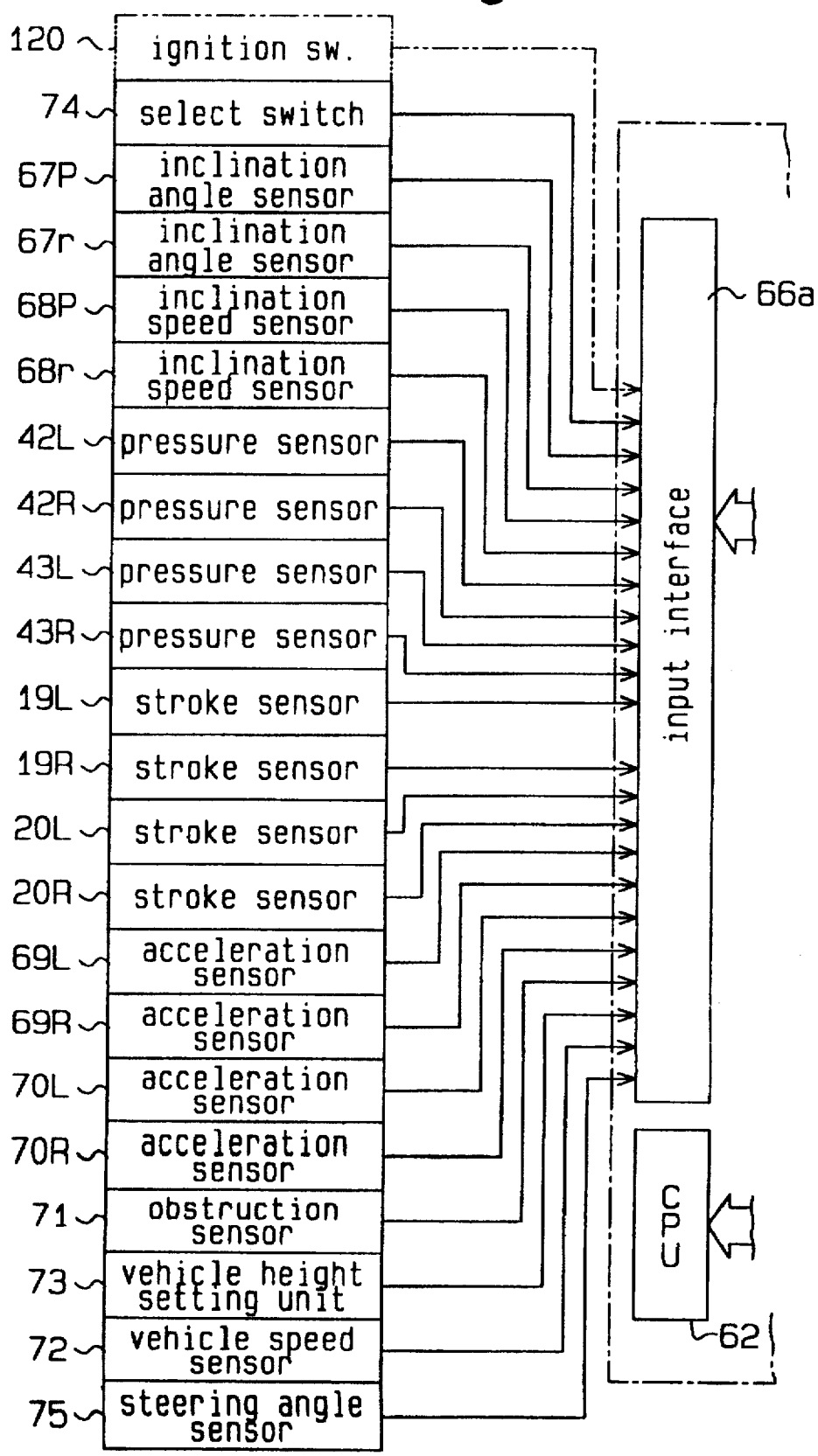
FIG. 1A is a partial block circuit diagram showing the electric constitution of a first embodiment of the present invention.
Figure 1B:
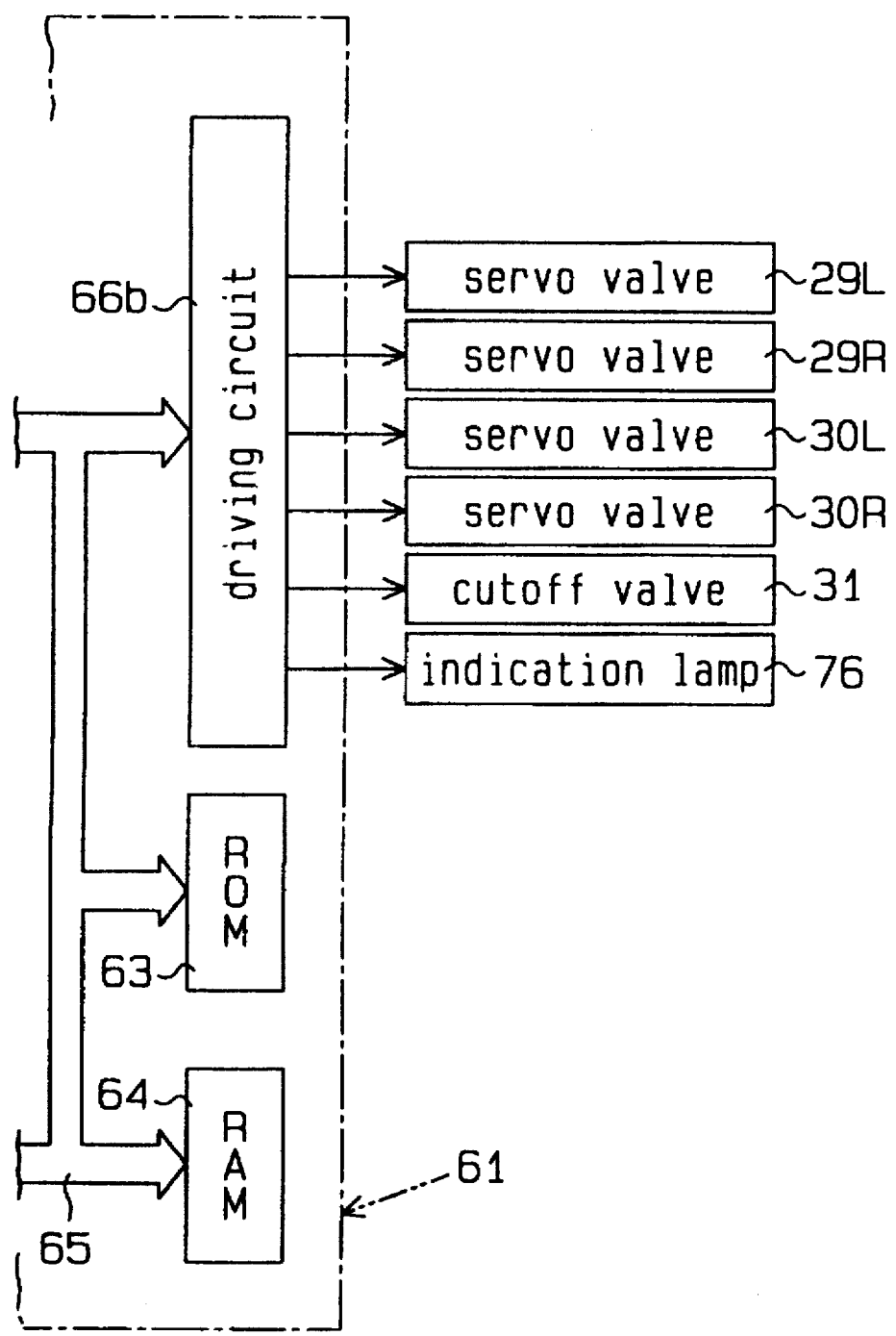
FIG. 1B is a partial block diagram showing the electric construction of the first embodiment.

The electric circuit of this embodiment will now be discussed with reference to FIGS. 1A and 1B. A control apparatus 61 employs a microcomputer. The control apparatus 61 includes a central processing unit (CPU) 62, a program memory 63 constituted of a read only memory (ROM), and a work memory 64 constituted of a random access memory (RAM). The CPU 62 is connected via a bus 65 to the program memory 63 and the work memory 64 and executes various processes in accordance with predetermined program data stored in the program memory 63. The work memory 64 temporarily stores the results of various computations executed by the CPU 62.

Stored in the program memory 63 are the aforementioned program data which the CPU 62 executes, and various kinds of data necessary for the execution. The various kinds of data include a map and equations showing the relationship between instruction voltages to the servo valves and the retracting/protracting amounts of the hydraulic cylinders 7, and a map and equations showing the relationship between the detection signals from the stroke sensors 19L, 19R, 20L and 20R and the lengths of the hydraulic cylinders 7. Also stored as data in the program memory 63 are a map showing the relationship among the steering angle, the vehicle speed and the lateral acceleration, a map or equations showing the relationship between the lateral acceleration and the roll angle $\phi$, and a map or equations showing the relationship between the forward/backward acceleration and the pitch angle $\theta$.

The CPU 62 is connected via the bus 65 and an input interface circuit 66a to inclination angle sensors 67p and 67r, inclination speed sensors 68p and 68r, the pressure sensors 42L, 42R, 43L and 43R, the stroke sensors 19L, 19R, 20L and 20R, acceleration sensors 69L, 69R, 70L and 70R, obstruction sensors 71, vehicle speed sensors 72, a vehicle height setting unit 73, a select switch 74 and a steering angle sensor 75. The CPU 62 is further connected via the bus 65 and a driving circuit 66b to the servo valves 29L, 29R, 30L and 30R, the cutoff valves 31 and an indication lamp 76.

The inclination angle sensors 67p and 67r and the inclination speed sensors 68p and 68r are located under the driver's seat in the vicinity of the center of gravity of the vehicle. The inclination angle sensor 67p detects the forward/backward inclination (pitch angle $\theta$) of the vehicle 1 with respect to the horizontal plane, and produces a detection signal corresponding to that angle. The inclination angle sensor 67r detects the rightward/leftward inclination (roll angle $\phi$) of the vehicle 1 with respect to the horizontal plane, and produces a detection signal corresponding to that angle. As the inclination angle sensors 67p and 67r, a liquid type sensor, a potentiometer type sensor using a pendulum or a torque balance type sensor is used. Those inclination angle sensors are affected by the horizontal acceleration.

The inclination speed sensor 68p detects the changing speed of the pitch angle and outputs a detection signal corresponding to the changing speed. The inclination speed sensor 68r detects the changing speed of the roll angle and outputs a detection signal corresponding to the changing speed. The acceleration sensors 69L, 69R, 70L and 70R, provided on the upper portion of the body frame 2 in the vicinity of the suspension systems 3 and 4, detect the vertical acceleration and produce the corresponding detection signals. The inclination angle sensors 67p and 67r, the inclination speed sensors 68p and 68r and the acceleration sensors 69L, 69R, 70L and 70R constitute means for detecting the inclination angle.

The three obstruction sensors 71 for detecting an obstruction or an obstacle are provided at the front lower portion of the vehicle, i.e. near both front wheels 12L and 12R and between those front wheels. As the obstruction sensors 71, a known ultrasonic sensor having a transmitting section and a receiving section (not shown) is used. The ultrasonic sensor sends out a pulse wave from the transmitting section and receives an echo reflected by an obstruction, if any, at the receiving section. When receiving such an echo within a predetermined period of time, the ultrasonic sensor outputs a detection signal indicating the presence of the obstruction. The obstruction-detectable range of each obstruction sensor 71 in front of the vehicle 1 is properly set within a range of 2 to 3 meters, for example. The obstruction-detectable ranges of the obstruction sensors 71 in the widthwise direction of the vehicle 1 are set such that they do not overlap one another, and the widthwise obstruction-detectable range of the center obstruction sensor 71 is set smaller than the distance between the suspension systems 4.

When receiving the detection signal indicative of the presence of an obstruction from the center obstruction sensor 71 and receiving no detection signal indicative of the presence of an obstruction from the other obstruction sensors 71, the CPU 62 determines that an obstruction is present between the right and left wheels and sends a lighting signal to the indication lamp 76. When receiving the detection signals indicative of the presence of an obstruction from the three obstruction sensors 71, the CPU 62 determines that the vehicle is approaching a slope or an obstruction extending across the vehicle, thus requiring no compensation for the vehicle height, and outputs a blink signal to the indication lamp 76.

The vehicle speed sensors 72 produce signals corresponding to the number of rotations of the hydraulic motors 13 and 15. The vehicle speed sensors 72 are used to obtain the traveling distance of the vehicle 1 from a point where a detection signal indicative of the absence of an obstruction after the detection signal indicative of the presence of an obstruction is input from the obstruction sensor 71, i.e., after it becomes possible to go over the obstruction. Each vehicle speed sensor 72 also has a function to detect the acceleration in the forward/backward direction (hereinafter called the forward/backward acceleration) and a function to detect the acceleration in the lateral direction (hereinafter called the lateral acceleration). The steering angle sensor 75 outputs a signal corresponding to the steering angle or the directing angles of the front wheels 12L and 12R.

The vehicle height setting unit 73 is located at a position for easy manipulation from the driver's seat. The vehicle height setting unit 73 has a turnable adjusting knob so that the output voltage can be continuously altered in proportion to the amount of rotation of the knob.

The select switch 74 is provided to select whether or not to allow the control apparatus 61 of the vehicle 1 to perform the state control and is manipulated by the driver. The control apparatus 61 performs the state control when the select switch 74 is set on and performs no state control when the select switch 74 is set off.

The CPU 62 receives the output signal of the vehicle height setting unit 73 and computes the target average vehicle height based on that signal. The average vehicle height (hereinafter simply referred to as "vehicle height") is obtained from the average value of the lengths of the four suspension systems 3 and 4. Based on the output signals of the stroke sensors 19L, 19R, 20L and 20R, the CPU 62 computes the retracting/protracting amounts of the hydraulic cylinders 7 from the reference position. Based on the output signals of the inclination angle sensors 67p and 67r, the inclination speed sensors 68p and 68r, the pressure sensors 42L, 42R, 43L and 43R and the acceleration sensors 69L, 69R, 70L and 70R, the CPU 62 computes the amount of displacement of the vehicle body from the horizontal state. For each sensor, the CPU 62 computes the amount of displacement from the horizontal state (reference state) at the target average vehicle height (hereinafter simply referred to as "target vehicle height") set by the vehicle height setting unit 73. The CPU 62 then obtains the retracting/protracting amounts of the individual hydraulic cylinders needed to set the vehicle body horizontal and to the initially set vehicle height, and computes corresponding instruction voltage values to the respective servo valves 29L, 29R, 30L and 30R. Then, the CPU 62 outputs the instruction voltages to the servo valves 29L, 29R, 30L and 30R.

Figure 8:
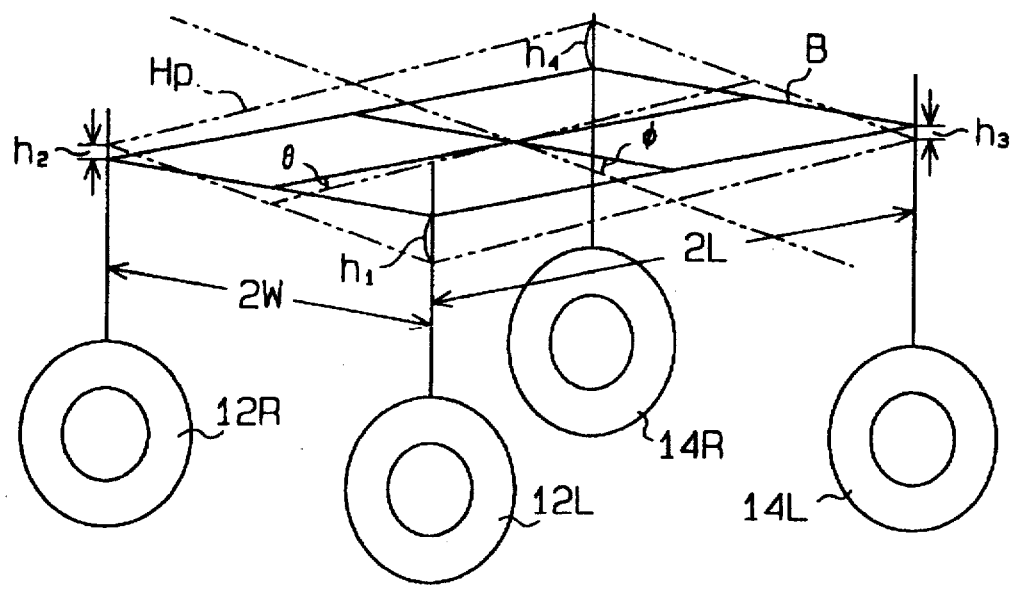
FIG. 8 is an exemplary diagram showing a vehicle shifted from an imaginary horizontal plane.

A description will now be given of how to accomplish the horizontal control of the vehicle body. FIG. 8 is an exemplary diagram showing a rectangular vehicle body B shifted to the position indicated by the solid line from an imaginary horizontal plane Hp indicated by the two-dot broken line. Given that the tread of the vehicle is 2W, the wheel base is 2L, the pitch angle is $\theta$ (radian) and the roll angle is $\phi$ (radian), the displacement amount h1 of the left front wheel 12L, the displacement amount h2 of the right front wheel 12R, the displacement amount h3 of the left rear wheel 14L, and the displacement amount h4 of the right rear wheel 14R are approximated by the following equations.

$$h1 = -h4 = L \sin\theta + W \sin\phi \quad (1)$$

$$h2 = -h3 = L \sin\theta - W \sin\phi \quad (2)$$

When the pitch angle $\theta$ and the roll angle $\phi$ are very small, it is allowable to set $\sin\theta = \theta$ and $\sin\phi = \phi$.

Figure 9:
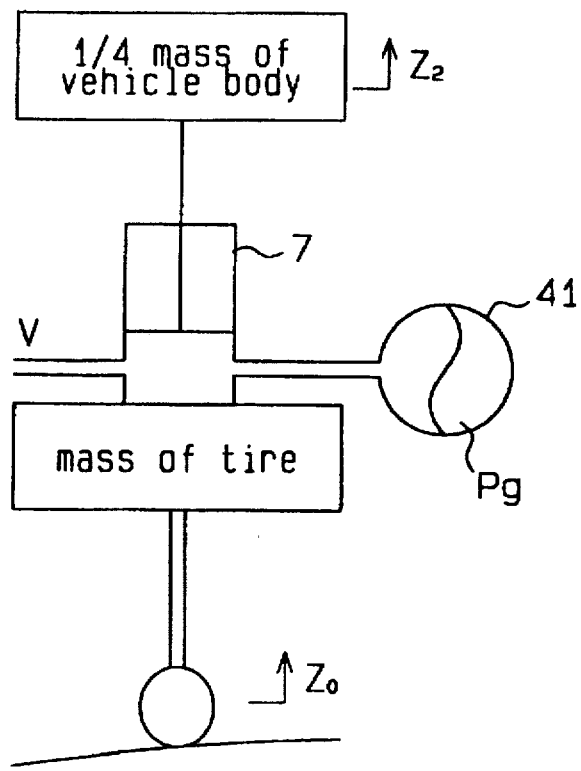
FIG. 9 is an exemplary diagram of the suspension system for supporting a wheel.

FIG. 9 is an exemplary view of one suspension system for supporting the wheel. Given that the pressure of the accumulator 41 is Pg, the displacement of the vehicle body is $Z_2$ and the derivative of the displacement $Z_2$ is $dZ_2$, the vehicle's state is given by the following equation. In FIG. 9, "$Z_0$" is the disturbance-oriented displacement.

$$(dx/dt) = Ax + Bu \quad (3)$$

where "x" represents the state vector and is given as $x = [Z_2 \; dZ_2 \; Pg]T$, "u" represents the control input (vector) and is given as $u = [V] = -kx$, (where V represents the instruction voltage to the servo valve and k represents a feedback gain) and "A" and "B" represent coefficient matrices. The feedback gain for "x", $k = [k1 \; k2 \; k3]$, is obtained by the design according to the LQ method (Linear Quadratic method) of the modern control theory.

Figure 7:
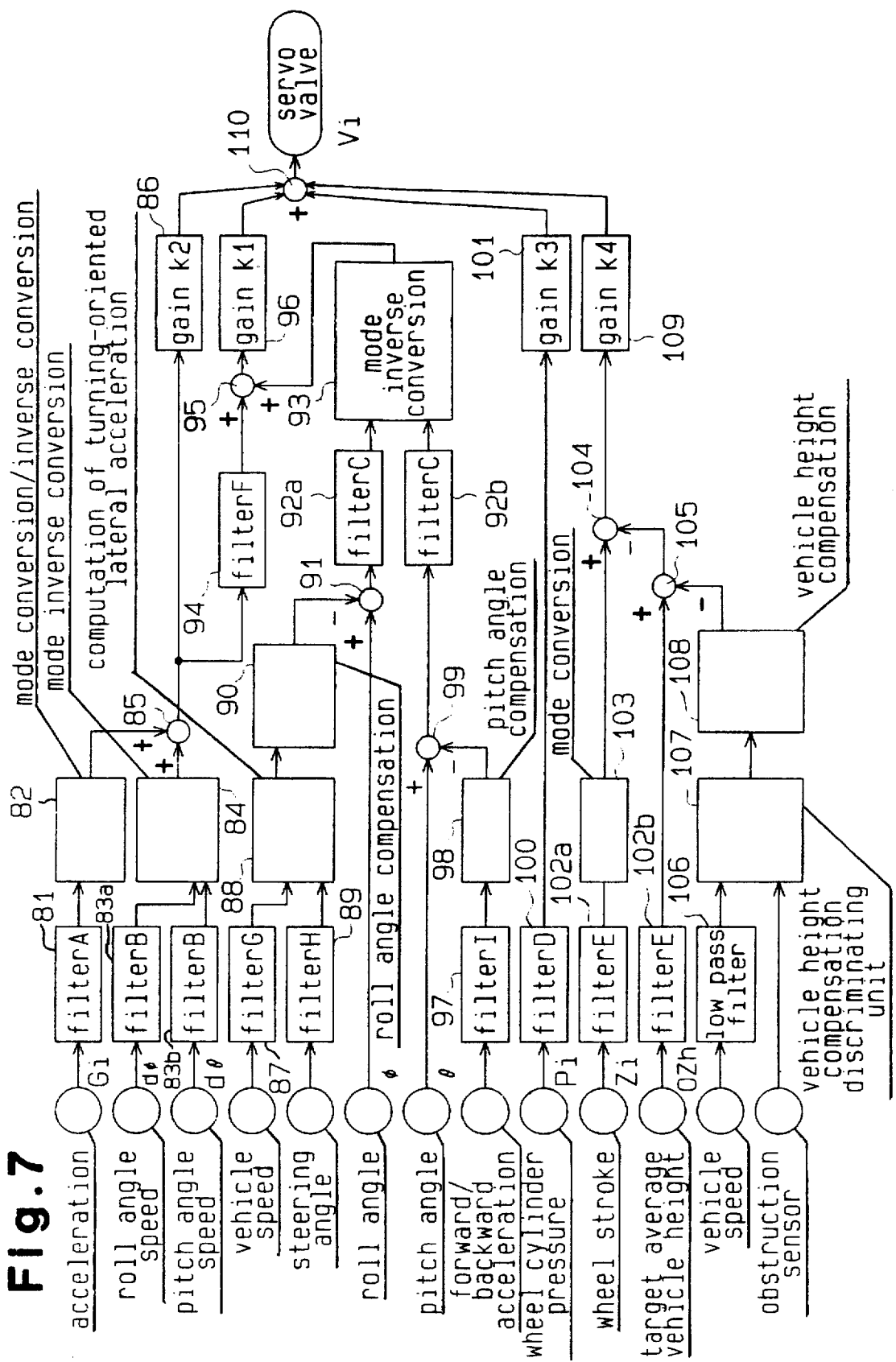
FIG. 7 is a block diagram of a control system.

The control system which is used in this feedback control will be described with reference to the block diagram in FIG. 7. FIG. 7 shows the control system, not the hardware constitution, and this control system is achieved by executing a series of programs stored in the program memory 63. The control system in FIG. 7 is for a single suspension system and a similar control is performed for each suspension system.

The vertical acceleration Gi detected by each of the acceleration sensors 69L, 69R, 70L and 70R is sent to a filter A81. The filter A81, which comprises a high-pass filter and an integrator, converts each acceleration Gi to a speed dhi that is in turn sent to a mode conversion/inverse conversion unit 82. The mode conversion/inverse conversion unit 82 first performs mode conversion to obtain the individual speeds in the heave mode, roll mode, pitch mode and warp mode, i.e., the heave speed $d\eta$, the roll angle speed $d\phi$, the pitch angle speed $d\theta$ and the warp speed dw, from four speeds dh1 to dh4 using the following equations (4) to (7). The "warp mode" is the mode in which the influence of the warp is considered.

$$d\eta = (dh1 + dh2 + dh3 + dh4)/4 \quad (4)$$

$$d\phi = (dh1 - dh2 + dh3 - dh4)/(4W) \quad (5)$$

$$d\theta = (dh1 + dh2 - dh3 - dh4)/(4L) \quad (6)$$

$$dw = (dh1 - dh2 - dh3 + dh4)/4 \quad (7)$$

Then, the mode inverse conversion is performed using approximation equations (8) and (9) to separate the roll angle speed $d\phi$ and the pitch angle speed $d\theta$ to the displacement speeds dh1 to dh4 of the individual wheels based on the heave speed $d\eta$, the roll angle speed $d\phi$, the pitch angle speed $d\theta$ and the warp speed dw.

$$dh1 = -dh4 = Ld\theta + Wd\phi \quad (8)$$

$$dh2 = -dh3 = Ld\theta - Wd\phi \quad (9)$$

The equations (8) and (9) are derived from the equations (4) to (7) as follows.

$$d\eta' = d\eta \times \eta Gain$$

$$d\phi' = d\phi \times \phi Gain$$

$$d\theta' = d\theta \times \theta Gain$$

$dw' = dw \times wGain$ $dh1 = d\eta' + d\phi' + d\theta' + dw'$ $dh2 = d\eta' - d\phi' + d\theta' - dw'$ $dh3 = d\eta' + d\phi' - d\theta' - dw'$ $dh4 = d\eta' - d\phi' - d\theta' + dw'$ Given that $\eta Gain=0$, $\phi Gain=W$, $\theta Gain=L$, and $wGain=0$, then $$dh1 = -dh4 = Ld\theta + Wd\phi \quad (8)$$

$$dh2 = -dh3 = Ld\theta - Wd\phi \quad (9)$$

Only the computations of the equations (8) and (9) may be performed in the mode conversion/inverse conversion unit 82.

The roll angle speed de and the pitch angle speed dθ detected by the inclination speed sensors 68r and 68p are sent to a mode inverse conversion unit 84 via filters B 83a and 83b, each constituted of a low-pass filter. The mode inverse conversion unit 84 performs the mode inverse conversion using the equations (8) and (9) to separate the roll angle speed dφ and the pitch angle speed dθ to the components of the individual wheels. The results of the computations in the mode conversion/inverse conversion unit 82 and the mode inverse conversion unit 84 are added and the result is sent to a multiplier 86. The multiplier 86 multiplies the added result by a gain k2, and produces a signal equivalent to the manipulation amount of the servo valve.

The roll angle speed dφ and pitch angle speed dθ computed based on the detection signals of the acceleration sensors 69L, 69R, 70L and 70R reflect changes in angular speeds in the high frequency range where those angular speeds change drastically. The roll angle speed dφ and pitch angle speed dθ detected by the inclination speed sensors 68r and 68p reflect changes in angular speeds in the low frequency range where those angular speeds change gradually. Adding both values yields values corresponding to changes in angular speeds over the entire region.

The vehicle speed detected by the vehicle speed sensor 72 is sent to a lateral acceleration computing unit 88 via a filter G87 constituted of a low-pass filter. The steering angle detected by the steering angle sensor 75 is sent to the lateral acceleration computing unit 88 via a filter H89 constituted of a low-pass filter. Namely, the lateral acceleration corresponding to the vehicle speed and steering angle is sent to the lateral acceleration computing unit when the vehicle is turned. Based on the input vehicle speed and steering angle, the lateral acceleration computing unit 88 computes the lateral acceleration corresponding to those inputs from a map or equations, and sends the computation result to a roll angle compensation unit 90. The roll angle compensation unit 90 sends a compensation inclination angle corresponding to the input lateral acceleration or a compensation roll angle to an adder 91. The roll angle φ detected by the inclination angle sensor 67r is added to the compensation roll angle produced from the roll angle compensation unit 90, and the resultant value is sent to a mode inverse conversion unit 93 via filter C92a constituted by a low-pass filter.

Adding the roll angle φ detected by the inclination angle sensor 67r and the compensation roll angle in the adder 91 eliminates the component based on the lateral acceleration from the detection signal of the inclination angle sensor 67r. Then, the signal equivalent to the actual roll angle of the vehicle body is sent to the filter C92a. Therefore, even if the inclination angle sensor 67r sends the detection signal indicating that the vehicle body is inclined further in the turning direction from the actual roll angle under the influence of lateral acceleration, the subsequent computations are performed based on the correct roll angle.

The pitch angle θ detected by the inclination angle sensor 67p is sent to an adder 99. The vehicle speed detected by the vehicle speed sensor 72 is sent to a filter I97 which comprises a low-pass filter and a differentiator, and is converted there to a forward/backward acceleration. This acceleration is sent to a pitch angle compensation unit 98. The pitch angle compensation unit 98 computes a compensation inclination angle corresponding to the pitch angle θ corresponding to the input forward/backward acceleration from a map or equations, and sends the computation result to the adder 99. Adding the pitch angle θ detected by the inclination angle sensor 67p and the compensation pitch angle from the pitch angle compensation unit 98 eliminates the component based on the forward/backward acceleration from the pitch angle θ. Therefore, even if the inclination angle sensor 67p produces a detection signal indicating that the vehicle body is inclined further in the forward/backward direction from the actual pitch angle under the influence of the forward/backward acceleration, the subsequent computations are performed based on the correct pitch angle.

The mode inverse conversion unit 93 performs the mode inverse conversion using the equations (1) and (2) to separate the roll angle φ and the pitch angle θ to the components of the individual wheels. The output of the adder is sent to a filter F94, which comprises a high-pass filter and an integrator, so that the displacement speeds dh1–dh4 are converted to displacement amounts h1 to h4. The output of the filter F94 and the output of the mode inverse conversion unit 93 are added by an adder 95 and the result is sent to a multiplier 96. The multiplier 96 multiplies the added result by a gain k1 and produces a signal equivalent to the manipulation amount of the servo valve.

The displacement amounts h1 to h4 computed based on the roll angle φ and the pitch angle θ detected by the inclination angle sensors 67r and 67p reflect the case where they change slowly (low-frequency range). Those displacement amounts h1–h4 do not sufficiently reflect the case where they change quickly (high-frequency range). Since the changes in the high-frequency range are computed as the displacement amounts h1–h4 based on the detection signals of the acceleration sensors 69L, 69R, 70L and 70R and the inclination speed sensors 68p and 68r, the output of the adder 95 sufficiently reflects changes in the entire range.

The pressure Pi of each hydraulic cylinder 7 detected by each of the pressure sensors 42L, 42R, 43L and 43R is sent to a filter D100 constituted by a low-pass filter to become a value equal to the pressure Pg of the accumulator 41. The output of the filter D100 is sent to a multiplier 101 to be multiplied by a gain k3. Then, the multiplier 101 produces a signal equivalent to the manipulation amount of the servo valve. It is to be noted that the pressure Pi represents a change (difference) from the initial value. The initial value is the pressure when the vehicle 1 is positioned on the horizontal plane and the vehicle height is set to the reference value. This pressure Pi does not change only from the force of people getting in or getting out of the vehicle.

The retraction/protraction amount (stroke amount) Zi of the hydraulic cylinder 7 detected by each stroke sensor 19L, 19R, 20L or 20R is input to a mode conversion unit 103 via a filter E102a constituted of a low-pass filter. The mode conversion unit 103 simply averages the four values to obtain the vertical displacement of a single wheel, which is in turn sent to an adder 104.

The target vehicle height OZh set by the vehicle height setting unit 73 is sent via a filter E102b to an adder 105. The vehicle speed detected by the vehicle speed sensor 72 is sent via a low-pass filter 106 to a vehicle height compensation discriminating unit 107. The detection signal from the obstruction sensor 73 is sent to the vehicle height compensation discriminating unit 107. The vehicle height compensation discriminating unit 107 determines whether or not the vehicle height compensation is necessary based on the detection signal from the obstruction sensor 73. Target vehicle height altering means or a vehicle height compensation unit 108 sends a predetermined vehicle height compensation amount to the adder 105 upon reception of a signal indicating the necessity of vehicle height compensation. The outputs of the vehicle height compensation unit 108 and the filter E102b are added together by the adder 105, and the resultant value is further added to the output of the mode conversion unit 103 by the adder 104. The result of the last addition is sent to a multiplier 109 to be multiplied by a gain k4. As a result, the multiplier 109 produces a signal equivalent to the manipulation amount of the servo valve.

The outputs of the individual multipliers 86, 96, 101 and 109 are added by an adder 110, and an instruction voltage corresponding to the added result is sent to each servo valve 29L, 29R, 30L or 30R. The gains k1 to k3 are equivalent to the gains k1 to k3 in the feedback gain k=[k1 k2 k3] for the vector x in the aforementioned state equation (3). The gain k4 is for the ordinary proportional control. Those gains k1 to k4 are stored in the program memory 63.

The operation of the vehicle attitude control apparatus will be described below.

In the case where the vehicle 1 runs on an ordinary paved road with a small inclination, when the driver determines that no state control is necessary, the driver sets the select switch 74 off. As the engine 21 runs, the hydraulic pump 23 is driven and the operation fluid pumped out from the hydraulic pump 23 is supplied via the main pipe 24 to the main manifold 25. If the select switch 74 is at the OFF position and no state control of the vehicle 1 is performed, the individual servo valves 29L, 29R, 30L and 30R are held at the state as shown in FIG. 6, disconnecting the supply ports and tank ports from the respective pipes 33 to 36.

While the vehicle 1 is running, the supply port of the cutoff valve 31 is held to communicate with the pipe 38. Under this situation, each pilot operation check valve 37 is held at a position so that the operation fluid can pass in any direction due to the pilot pressure. That is, the action of the accumulator 41 always acts in the chamber 16b of each hydraulic cylinder 7. Under this condition, the accumulator 41 absorbs a fluctuation caused by small upheavals in the road. When the reactive force acting on the front wheels 12L and 12R and the rear wheels 14L and 14R from the road surface, according to upheavals in the road, changes during the driving of the vehicle 1, the hydraulic cylinder 7 retracts or protracts due to the spring action of the accumulator 41. Even on a rough road surface, the vehicle 1 runs with the vehicle body stably positioned. While the vehicle 1 is stopped, the cutoff valve 31 is held in such a way that the tank port communicates with the pipe 38, and the hydraulic cylinder 7 is kept at the unretractable or unprotractable state.

Figure 5B:
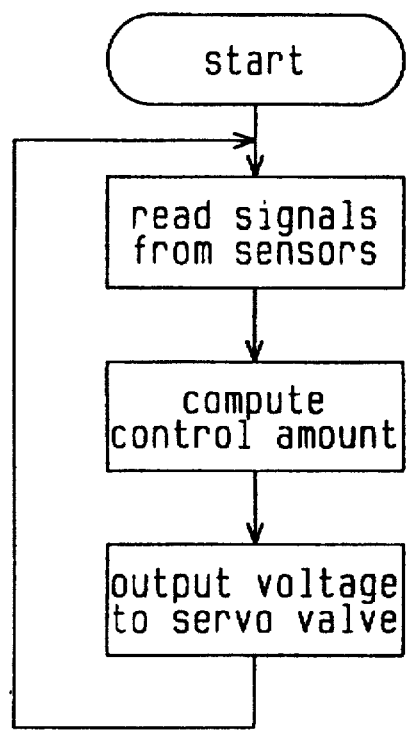
FIG. 5B is a flowchart for explaining the function of the first embodiment in state control mode.

When driving the vehicle 1 off-road, the driver sets the select switch 74 on. To perform the state control, the CPU 62 repeats the sequence of operations of receiving the output signals of the individual sensors and the vehicle height setting unit 73, computing the control amount of each hydraulic cylinder 7, and sending the instruction voltage equivalent to the control amount to the individual servo valves 29L, 29R, 30L and 30R, as shown in FIG. 5B. When the vehicle 1 moves on a slope or goes over upheavals and depressions while running in the horizontal state, the various sensors detect the displacement amounts from the horizontal state and send the detection signals to the CPU 62. More specifically, the acceleration detection signals from the acceleration sensors 69L, 69R, 70L and 70R and the detection signals from the inclination speed sensors 68r and 68p indicative of changes in the inclination angle speeds are sent to the CPU 62.

The CPU 62 receives the detection signals about the pitch angle $\theta$ and the roll angle $\phi$ from the inclination angle sensors 67r and 67p and the detection signals equivalent to the wheel load from the pressure sensors 42L, 42R, 43L and 43R. Based on those signals, the CPU 62 computes the displacement amounts of the individual wheels from the horizontal state. Based on the detection signals from the stroke sensors 19L, 19R, 20L and 20R, the CPU 62 computes the vehicle height and the difference between this vehicle height and the target vehicle height. To lift up or down the individual hydraulic cylinders 7 to keep the vehicle body horizontal and at the target vehicle height, the CPU 62 computes instruction voltages for the individual servo valves 29L, 29R, 30L and 30R to set the opening of each servo valve and the moving direction of the operation fluid. Those computations are executed in the above-described manner by the control system in FIG. 7. Even if the inclination angle sensor 67r is influenced by lateral acceleration during turning or if the inclination angle sensor 67p is influenced by forward/backward acceleration, the computations of the instruction voltages are not affected.

To protract the suspension systems 3 and 4 or the hydraulic cylinders 7, the supply ports of the individual servo valves 29L, 29R, 30L and 30R are held connected to the pipes 33 to 36 to supply the operation fluid to the chambers 16b of the hydraulic cylinders 7. To retract the hydraulic cylinders 7, the tank ports of the individual servo valves 29L, 29R, 30L and 30R are held connected to the pipes 33 to 36. The wheel load, which is the reactive force to the dead weight of the vehicle 1, always acts on the hydraulic cylinders 7 in the direction to retract the hydraulic cylinders 7. Under this situation, therefore, the operation fluids in the chambers 16b of the individual hydraulic cylinders 7 are discharged passing through the individual servo valves 29L, 29R, 30L and 30R, retracting the hydraulic cylinders 7. The amounts of the operation fluids supplied to the chambers 16b and the speeds of supplying the operation fluids there and the amounts of the operation fluids discharged from the chambers 16b and the speeds of discharging the operation fluids therefrom are determined by the openings of the servo valves 29L, 29R, 30L and 30R. The adjustment of the openings of the servo valves 29L, 29R, 30L and 30R and the switching between the connection and disconnection of the individual ports of those servo valves and the individual pipes 33–36 are performed based on the instruction voltages from the CPU 62.

The vehicle height is set by the driver's manipulation of the vehicle height setting unit 73. The vehicle height is set to the reference vehicle height when driving the vehicle on ordinary roads, whereas the target vehicle height is set high when driving the vehicle in rivers, fields or the like. The vehicle height may be set high even when driving on ordinary roads, depending on the driver's preference. The alteration of the vehicle height may be carried out during driving or while the vehicle is stopped. When the vehicle height setting unit 73 is manipulated during driving, the CPU 62 computes the vehicle height based on the detection signals from the stroke sensors 19L, 19R, 20L and 20R and computes the difference between the computed vehicle height and the target vehicle height. Then, the CPU 62 computes the instruction voltages to the individual servo valves 29L, 29R, 30L and 30R to keep the vehicle body horizontal and at the target vehicle height, and supplies the instruction voltages to the associated servo valves 29L, 29R, 30L and 30R. Consequently, when driving in a river, a field or the like, the vehicle body moves above the surface of the water or grasses thus reducing the resistance so the vehicle can run smoothly.

When the detection signal only from the center obstruction sensor 71 is produced during driving, the CPU 62 determines that there is an obstruction and produces a signal to light an indication lamp. As a result, the indication lamp 76 is lit to draw the driver's attention. When determining that there is an obstruction, the CPU 62 causes the vehicle height compensation unit 108 to compute the vehicle height compensation amount and sends the proper instruction voltages to the servo valves 29L, 29R, 30L and 30R so that the vehicle height becomes the target vehicle height plus the vehicle height compensation amount. The vehicle height compensation amount is equivalent to the further protractable length of the hydraulic cylinder 7 which is protracted at that time, or a length shorter by a predetermined amount than that length.

The CPU 62 obtains the moving distance (MD) of the vehicle 1 from the time (t1) when the detection signal indicative of the presence of an obstruction from the obstruction sensor 71 is received to the point (t2) when the CPU 62 no longer receives that detection signal from the obstruction sensor 71. The CPU 62 computes the distance (D1) to the obstruction from the vehicle 1 at the time t2 based on the distance (D0) to the obstruction from the vehicle 1 at the time t1 when the CPU 62 has received the detection signal indicative of the presence of the obstruction and the moving distance MD. The CPU 62 executes the state control in such a way that the vehicle height equal to the target vehicle height plus the vehicle height compensation amount is maintained while the vehicle 1 moves a distance equal to the sum of the distance D2 to the obstruction and the vehicle's length plus a predetermined value. As a result, the vehicle 1 passes above the obstruction.

Thereafter, the vehicle height compensation amount is set to zero and the target vehicle height is returned to the initial value before the detection of the obstruction. When the CPU 62 receives the detection signal indicative of the presence of an obstruction even after the height of the vehicle 1 is controlled to be at the compensated target vehicle height, the CPU 62 determines that there is an obstruction which cannot be driven over, and stops running the vehicle. According to this embodiment, as discussed above, where there is an obstruction the vehicle can ride over, the vehicle height is automatically adjusted so that the vehicle 1 drives over the obstruction. This simplifies driving.

As apparent from the above, the state control apparatus executes the state control in a way such that not only a change in the inclination angle from the horizontal state but also a combination of that change and a change in the wheel load is set to zero. This method improves the performance of keeping the vehicle body horizontal particularly when the vehicle runs off-road. For example, when only one wheel falls into a hole or rut in the road, the inclination angle of the vehicle body may not change in some cases. Even in such a case, however, the wheel load changes so that the suspension system for this wheel is controlled to set the change in the wheel load to zero. Not that only one hydraulic cylinder 7 protracts to hold the vehicle horizontal, but the other hydraulic cylinders 7 retract so as to adjust the vehicle height to the set vehicle height (target vehicle height), i.e., all the suspension systems 3 and 4 retract or protract. Even if the states of the other wheels, which are not in a hole or rut, are changed from the previous states, a change in the state of the vehicle body becomes smaller. On the other hand, in the case of the apparatus which controls only the change in inclination angle to zero, even when one wheel is lifted above the road, no state control is performed if the inclination angle is zero. The state control is not carried out until the states of the other wheels change, varying the inclination angle. This impairs the stability of the vehicle body.

According to this vehicle attitude control apparatus, as described above, even if the inclination angle sensor for detecting the roll angle $\phi$ produces a detection signal indicating a roll angle different from the actual roll angle $\phi$ under the influence of lateral acceleration while turning the vehicle, the control is executed on the basis of the value equivalent to the actual roll angle $\phi$. As a result, the vehicle can run stably on unpaved roads and slopes.

When the vehicle 1 is accelerated or decelerated abruptly, the inclination angle sensor 67p is affected by the forward/backward acceleration. In accordance with the ratio of the forward/backward acceleration, this sensor 67p outputs the detection signal indicating that the vehicle is overinclined forward at the time of the abrupt acceleration or outputs the detection signal indicating that the vehicle is overinclined backward at the time of the abrupt deceleration. According to this embodiment, however, the component originating from such a forward/backward acceleration is removed and the state control is carried out based on the value equivalent to the actual pitch angle $\theta$. Consequently, even if the vehicle 1 is accelerated or decelerated suddenly, the vehicle body is kept horizontal so that the driver will not feel uncomfortable.

Figure 10:
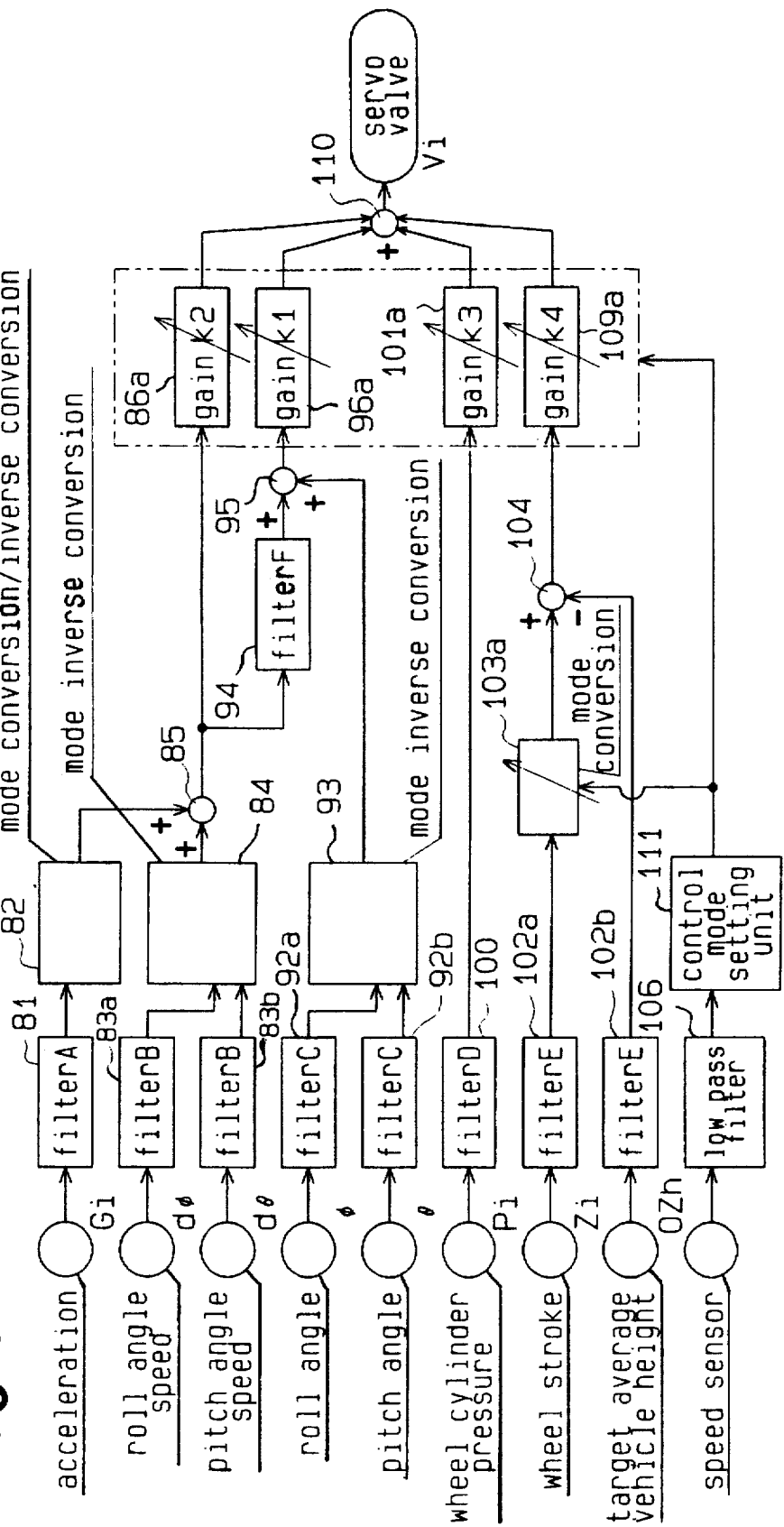
FIG. 10 is a block diagram of a control system according to a second embodiment.

A second embodiment will now be described with reference to FIG. 10. This embodiment differs considerably from the first embodiment in that the gain at the time of executing the vehicle attitude control based on the vehicle speed is automatically changed and no compensation is performed for the lateral acceleration and the forward/backward acceleration. The control which increases the amount of the retraction/protraction of the suspension systems 3 and 4 is not required when a vehicle runs on a flat road and becomes necessary when the vehicle runs off-road or on a sharp slope. When a vehicle runs off-road or on a sharp slope, the vehicle runs at a low speed. This embodiment executes the state control quickly responsive to a state change from the horizontal state when a vehicle runs at a speed equal to or lower than a prescribed speed, as in the first embodiment, and executes the state control based on a reduced gain when the vehicle runs faster than the prescribed speed.

The electric circuit of this embodiment is the electric circuit of the first embodiment shown in FIG. 1 from which the obstruction sensor 71, the select switch 74, the steering angle sensor 75 and the indication lamp 76 are omitted. A reference speed (e.g., 10 km/h) for switching the control mode is stored in the program memory 63. FIG. 10 presents a block diagram showing the control system of the second embodiment. Like or the same reference numerals as used for the first embodiment will also be used to denote corresponding or identical components of this embodiment.

The vehicle speed detected by the vehicle speed sensor 72 is sent via the low-pass filter 106 to a control mode setting unit 111. The control mode setting unit 111 computes the difference between the input vehicle speed and the reference vehicle speed and determines whether a vehicle is under the situation that requires state control basically the same as that of the first embodiment; that is, when the difference is equal to or less than zero or the vehicle is running at a low speed, state control like the first embodiment is required. The control mode setting unit 111 thus determines whether normal state control mode should be performed. When the difference is greater than zero or the vehicle is running at a high speed, the control mode setting unit 111 determines that a shock absorbing mode is needed to absorb shocks against the vehicle body. The control mode setting unit 111 produces a signal indicative of the normal state control mode or the shock absorbing mode to a mode conversion unit 103a and individual multipliers 86a, 96a, 101a and 109a.

The mode conversion unit 103a computes the stroke amount from the following equations.

$$Zh=\{(Z1+Z2+Z3+Z4)/4\}\times ZhGain$$

$$Zp=\{(Z1+Z2-Z3-Z4)/4\}\times ZpGain$$

$$Zr=\{(Z1-Z2+Z3-Z4)/4\}\times ZrGain$$

$$Zw=\{(Z1-Z2-Z3+Z4)/4\}\times ZwGain$$

where Zh indicates the stroke amount of the heave mode, Zp indicates the stroke amount of the pitch mode, Zr indicates the stroke amount of the roll mode, Zw indicates the stroke amount of the warp mode, Z1 indicates the stroke amount of the left front wheel 12L, Z2 indicates the stroke amount of the right front wheel 12R, Z3 indicates the stroke amount of the left rear wheel 14L, and Z4 indicates the stroke amount of the right rear wheel 14R. In the normal state control mode, the mode inverse conversion is performed from the following equations with ZhGain=1, ZpGain=ZrGain=ZwGain=0.

$$Z1=Zh+Zp+Zr+Zw$$

$$Z2=Zh+Zp-Zr-Zw$$

$$Z3=Zh-Zp+Zr-Zw$$

$$Z4=Zh-Zp-Zr+Zw$$

The output of the mode conversion unit 103a and the output of the filter E102b are added by the adder 104, and the resultant value is sent to the multiplier 109a. When receiving the signal indicative of the normal state control mode from the control mode setting unit 111, the individual multipliers 86a, 96a, 101a and 109a respectively multiply the inputs from the adders 85 and 95, the filter D100 and the adder 104 by the gains k1, k2, k3 and k4 stored in the program memory 63.

In the shock absorbing mode, the individual multipliers 86a, 96a, 101a and 109a respectively multiply the inputs from the adders 85 and 95, the filter D100 and the adder 104 by the gains k1, k2, k3 and k4 smaller than those used in the normal state control mode and according to the vehicle speed. The gains k1, k2, k3 and k4 in the shock absorbing mode are previously stored as a map in the program memory 63 in association with vehicle speeds, or are computed from relational equations based on the gains k1, k2, k3 and k4 used in the normal state control mode. As one example of the relation between the gains in the shock absorbing mode and vehicle speeds, the gains in the shock absorbing mode at a low speed (vehicle speed of 10 km/h) are set to values obtained by multiplying the gains k1, k2, k3 and k4 in the normal state control mode by "1" and the gains in the shock absorbing mode at a high speed (vehicle speed of 20 to 30 km/h) are set to values obtained by multiplying the gains k1, k2, k3 and k4 in the normal state control mode by "0". For any intermediate vehicle speed, the gains are set so as to linearly change between the gains obtained by the above multiplications.

At the time of computing the stroke amounts Zh, Zp, Zr and Zw in the individual modes, the mode conversion unit 103a sets ZhGain to a constant or "1" regardless of the vehicle speed. Those stroke amounts are used in the computation of the stroke amounts Z1, Z2, Z3 and Z4 of the individual wheels in the mode inverse conversion. The other ZpGain, ZrGain and ZwGain are linearly changed from "0" to "1" in accordance with the vehicle speed when in use. For example, ZpGain=ZrGain=ZwGain=0 for a low speed (vehicle speed: 10 km/h) and ZpGain=ZrGain=ZwGain=1 for a high speed (vehicle speed: 20 to 30 km/h). For a vehicle speed between those speeds, values multiplied by a predetermined coefficient corresponding to the vehicle speed are used.

Accordingly, at the time the normal state control mode is changed to the shock absorbing mode, the input value to the multiplier 109a gradually increases as the vehicle speed changes to a high speed from a low speed; so does the output of the multiplier 109a. At the time the shock absorbing mode is changed to the normal state control mode, the input value to the multiplier 109a gradually decreases as the vehicle speed changes to a low speed from a high speed; so does the output of the multiplier 109a. This reduces the shock at the time the mode is changed from the normal state control mode to the shock absorbing mode or vice versa.

When the vehicle 1 runs at a low speed on a mountain or in a forest, the control mode setting unit 111 determines that the normal state control mode is needed and the state control is performed in the same manner as done in the first embodiment. When the vehicle 1 moves away from the mountain or forest onto an ordinary road and the vehicle speed increases beyond the reference speed, the control mode setting unit 111 automatically switches the control mode to the shock absorbing mode. Then, the stroke amount corresponding to the vehicle speed is sent to the multiplier 109a and this input is multiplied by gains smaller than those used in the normal state control mode in the multipliers 86a, 96a, 101a and 109a. When the vehicle 1 runs on an ordinary road having no large upheavals, therefore, even if the wheel load, the inclination angle of the vehicle body or the like changes, the instruction voltages to the respective servo valves 29L, 29R, 30L and 30R become smaller.

For example, when the vehicle 1 passes a hole larger than the diameter of a single wheel, the wheel load is reduced and the vehicle body is inclined. In the normal state control mode, the instruction voltages are output to the servo valves 29L, 29R, 30L and 30R to protract or retract the hydraulic cylinders 7 by the control amounts corresponding to the changes in the wheel load and the inclination angle of the vehicle body in such a manner that those changes become zero. When the wheel comes out of the hole, the state of the vehicle body shifts again to the opposite side. Then, the control to set this change to zero is performed. Since the time it takes for the wheel to pass the hole is short, the state of the vehicle body is controlled twice in a short period of time, increasing a change in the state of the vehicle body. When the shock absorbing mode is set, however, the amount of the protraction or retraction of the hydraulic cylinders 7 becomes smaller, reducing the change in the state of the vehicle body. Stability under high-speed driving is therefore obtained.

The values of ZpGain, ZrGain and ZwGain used in the computations for the speed transition from a low speed to a high speed and the values of the gains which are used in the multiplications in the multipliers 86a, 96a, 101a and 109a may be changed stepwise instead of being changed linearly. A plurality of reference vehicle speeds may be provided so that the coefficients by which the gains k1, k2, k3 and k4 are multiplied are changed in accordance with the vehicle speed. In the shock absorbing mode, the individual gains k1, k2, k3 and k4 may be set to zero. In this case, the vibration of the vehicle body is absorbed by the accumulator 41. Further, the coefficients by which the individual gains k1, k2, k3 and k4 are multiplied may take different values between at the time of acceleration and at the time of deceleration.

This embodiment has the same functions and advantages about the state control as the first embodiment except for the function and advantage of allowing the vehicle to automatically go over an obstruction based on the detection signal from the obstruction sensor 71 and the function and advantage of compensating for the influence of the horizontal acceleration. When the vehicle runs on an ordinary road, requiring no normal state control, the operation amounts of the servo valves 29L, 29R, 30L and 30R and the drive amounts of the hydraulic cylinders 7 automatically become smaller, reducing the consumed energy. The structure which sets the gains k1, k2, k3 and k4 to zero in the shock absorbing mode eliminates the need for the computation of the gains k1, k2, k3 and k4 from the detection signals from the individual sensors by the CPU 62 when the vehicle runs at a high speed.

Figure 11A:
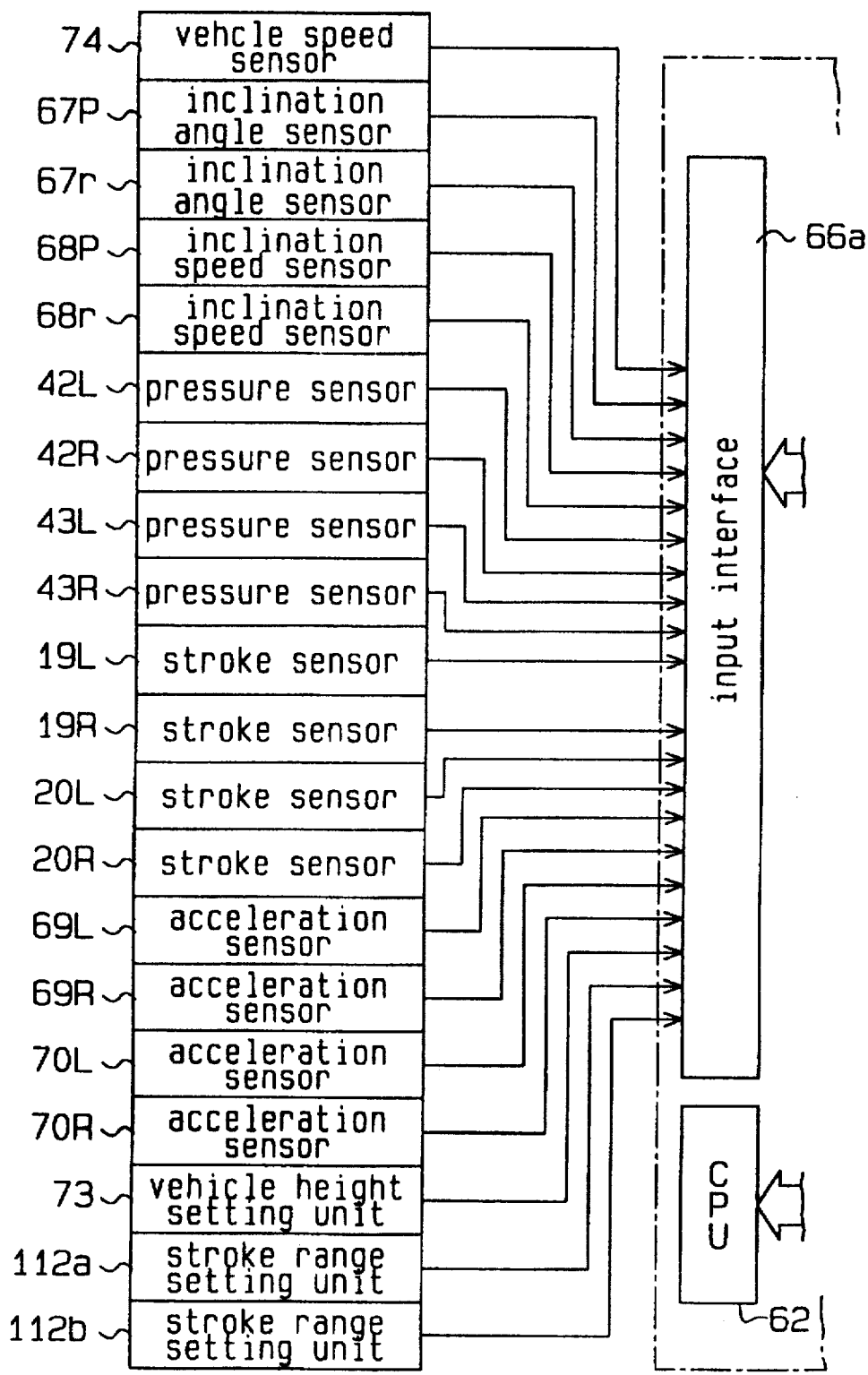
FIG. 11A is a block diagram showing the electric constitution of a third embodiment.
Figure 11B:
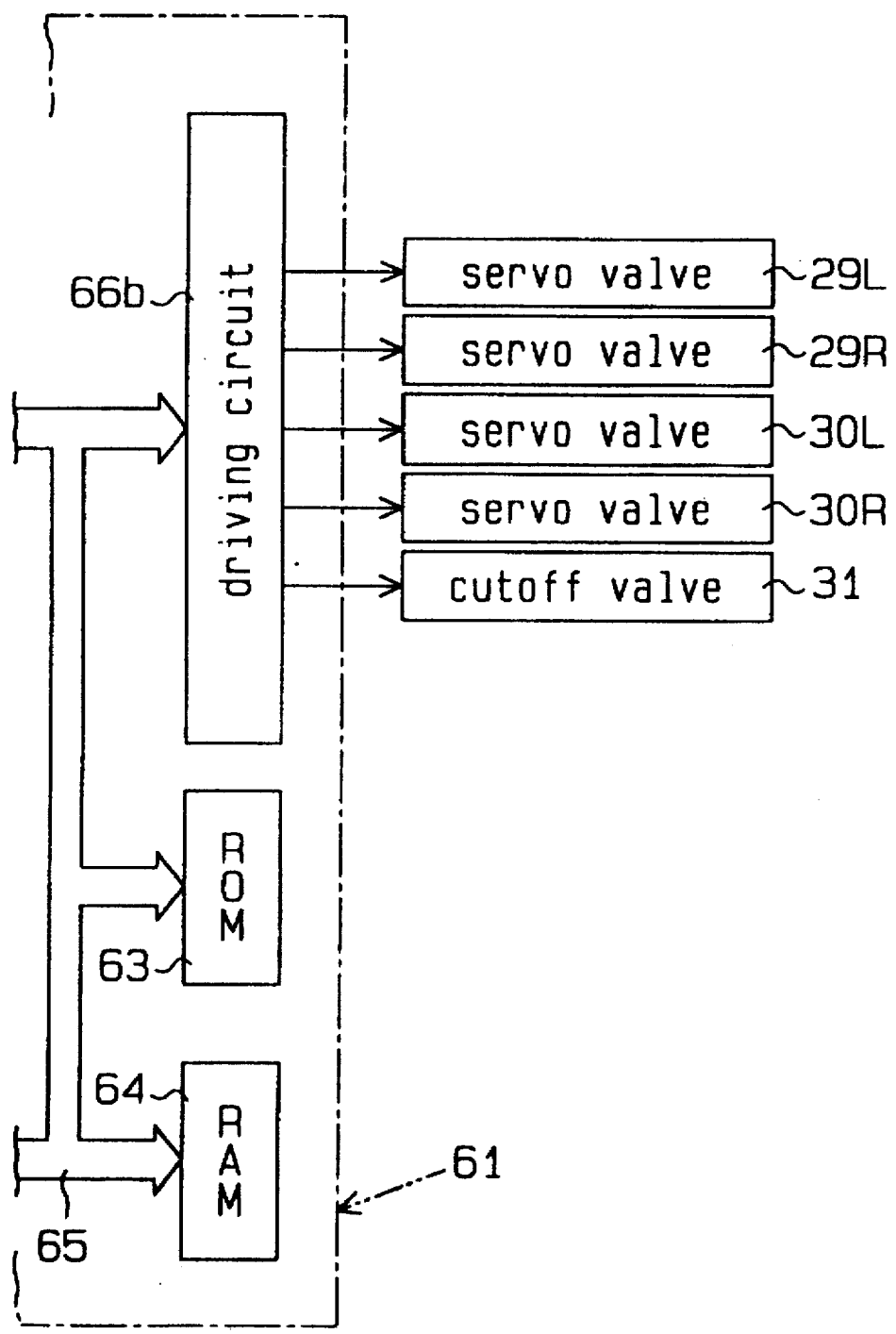
FIG. 11B is a partial block diagram showing the electric construction of the third embodiment.
Figure 12:
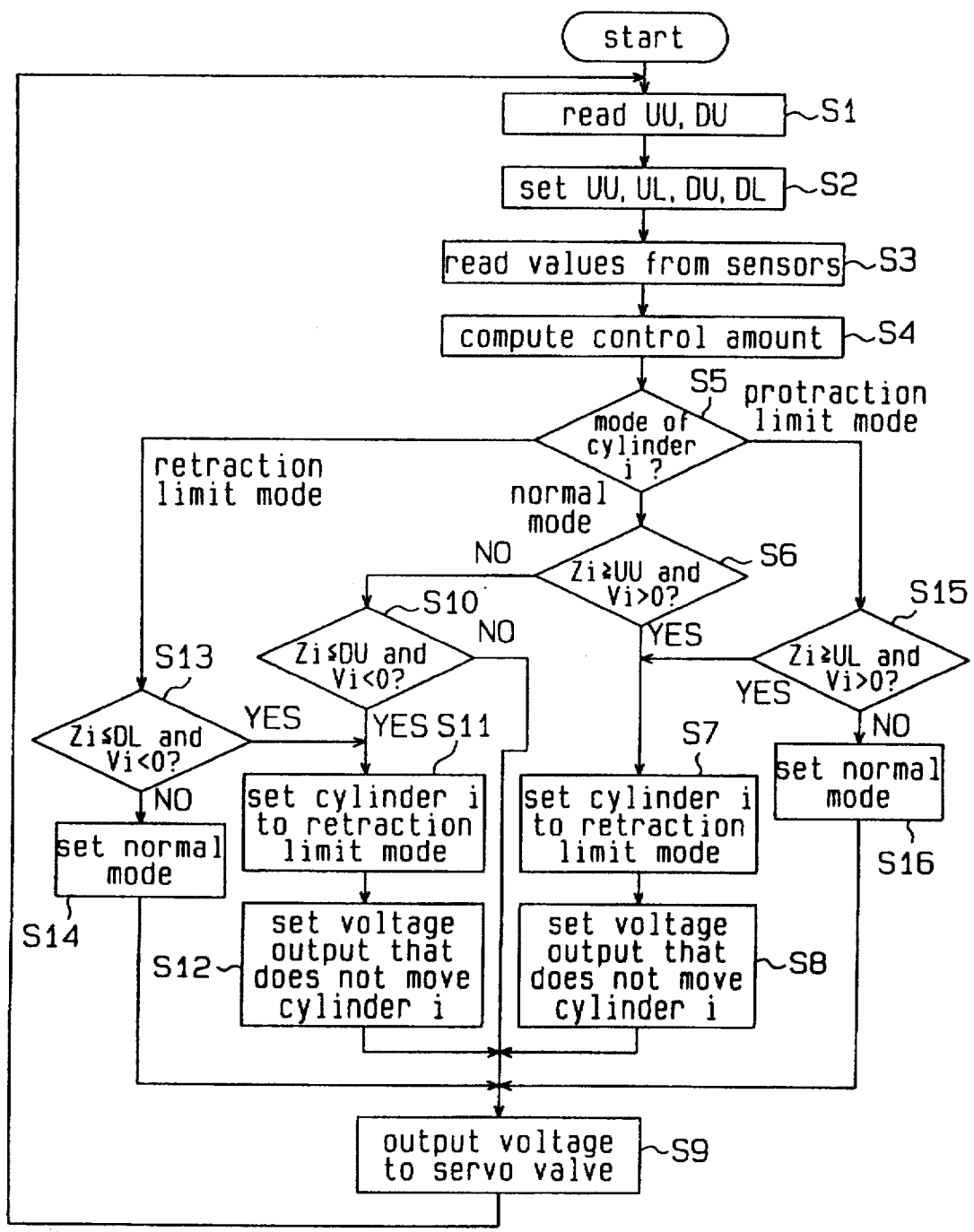
FIG. 12 is a flowchart for explaining the function of the third embodiment in state control mode.

A third embodiment will now be described with reference to FIGS. 11A, 11B, and 12. This embodiment differs from the first and second embodiments in that when the vehicle 1 drives up or down on a sharp slope, the stroke range of the hydraulic cylinder 7 is adjustable. As shown in FIGS. 11A and 11B, the electric circuit of this embodiment is the electric circuit of the first embodiment from which the obstruction sensor 71, the select switch 74, the steering angle sensor 75 and the indication lamp 76 are omitted. A protraction stroke range setting unit 112a and a retraction stroke range setting unit 112b are additionally provided instead. Both stroke range setting units 112a and 112b are located at positions allowing easy manipulation from the driver's seat. Both stroke range setting units 112a and 112b have turnable knobs and output set signals for setting the stroke ranges for the hydraulic cylinders 7 in proportion to the positions of the knobs. The CPU 62 can receive the set signals from the stroke range setting units 112a and 112b when the vehicle speed is zero.

When the vehicle 1 runs off-road other than on a sharp slope, both stroke range setting units 112a and 112b are so adjusted as not to restrict the stroke ranges of the hydraulic cylinders 7. Then, the state control is executed in the same manner as done in the first embodiment.

When the vehicle 1 drives up or down a sharp slope, the driver should manipulate the stroke range setting units 112a and 112b according to the driver's preference to set the stroke ranges for the hydraulic cylinders 7. The CPU 62 outputs instruction voltages to the servo valves 29L, 29R, 30L and 30R in accordance with the flowchart in FIG. 12.

In step S1, the CPU 62 receives the set signals from both stroke range setting units 112a and 112b, i.e., a stroke limit value on the protracting side (hereinafter simply called protracting limit value) UU and a stroke limit value on the retracting side (hereinafter simply called retracting limit value) DU. In the next step S2, the CPU 62 stores the protracting limit value UU and a protracting limit release value UL, and the retracting limit value DU and a retracting limit release value DL in a predetermined memory area in the work memory 64 based on the protracting limit value UU and retracting limit value DU. The protracting limit value UU is the maximum value for the stroke amount under the set condition, and the retracting limit value DU is the minimum value for the stroke amount under the same set condition. The protracting limit release value UL is a value smaller by a predetermined amount than the protracting limit value UU, and the retracting limit release value DL is a value greater by a predetermined amount than the retracting limit value DU.

The CPU 62 receives the output signal of the vehicle height setting unit 73 in the subsequent step S3, and then proceeds to step S4. In this step S4, the CPU 62 computes the control amounts of the individual hydraulic cylinders 7 in substantially the same manner as in the first embodiment.

The CPU 62 then proceeds to the next step S5 to determine in which mode, the retraction limit mode, normal mode or protraction limit mode, the hydraulic cylinders 7 are. When the mode is the normal mode, the flow goes to step S6 to determine if the stroke amount Zi of each hydraulic cylinder 7 is equal to or greater than the protracting limit value UU ($Zi \geq UU$) and the instruction voltage Vi to each servo valve is greater than zero (Vi>0). If the determination is affirmative (YES), the flow proceeds to step S7 to set the hydraulic cylinder 7 in the protraction limit mode, and then moves to step S8 to set the instruction voltage that does not move the hydraulic cylinder 7. In the next step S9, this instruction voltage is sent to the associated servo valve.

When the determination in step S6 is negative (NO), the flow goes to step S10 to determine if the stroke amount Zi is equal to or smaller than the retracting limit value DU ($Zi \leq DU$) and the instruction voltage Vi to each servo valve is smaller than zero (Vi<0). If the determination is negative (NO), the flow proceeds to step S9, and if the determination is affirmative (YES), the flow proceeds to step S11. After setting the hydraulic cylinder 7 in the retraction limit mode in this step S11, the flow moves to step S12 to set the instruction voltage that does not move the hydraulic cylinder 7. The flow then proceeds to step S9.

When the mode is the retraction limit mode in step S5, the flow goes to step S13 to determine if the stroke amount Zi is equal to or smaller than the retracting limit release value DL ($Zi \leq UL$) and the instruction voltage Vi to each servo valve is smaller than zero (Vi>0). If the determination is YES, the flow proceeds to step S11, and if the determination is NO, the flow proceeds to step S14. After setting the normal mode in this step S14 or setting the instruction voltage corresponding to the control amount computed in step S4, the flow moves to step S9.

When the mode is the protraction limit mode in step S5, the flow goes to step S15 to determine if the stroke amount Zi is equal to or greater than the protracting limit release value UL ($Zi \geq UL$) and the instruction voltage Vi to each servo valve is greater than zero (Vi>0). If the determination is YES, the flow proceeds to step S7, and if the determination is NO, the flow proceeds to step S16. After setting the normal mode in this step S16 or setting the instruction voltage corresponding to the control amount computed in step S4, the flow moves to step S9. The CPU 62 executes the above-described operation for the four wheels to output the instruction voltages to the servo valves 29L, 29R, 30L and 30R.

When the vehicle drives up or down a sharp slope, the CPU 62 first computes the instruction voltage values to the servo valves 29L, 29R, 30L and 30R in order to set the vehicle body horizontal and at the target vehicle height set by the vehicle height setting unit 73 based on the normal state control program. When the computed values exceed the stroke ranges of the hydraulic cylinder 7 set by the stroke range setting units 112a and 112b, the instruction voltages are set to the values corresponding to the upper limits or lower limits of the stroke ranges and the set values are then produced. As a result, the vehicle 1 runs facing higher than the horizontal state when driving up a slope and runs facing lower than the horizontal state when driving down the slope. It is therefore possible to set the incline of the vehicle body inclined to some extent in the same direction as the slope surface according to the driver's preference.

According to this embodiment, not only the stroke amount of the hydraulic cylinder 7 is restricted, but the upper limit (protracting limit value) and lower limit (retracting limit value) of the stroke range of the hydraulic cylinder 7 are set. Non-control areas of a predetermined range are provided near the upper and lower limits. Without the non-control areas, in the case where the state control is executed, when the stroke amount of the hydraulic cylinder 7 reaches the upper limit, the state control immediately, upon the slight retraction of the hydraulic cylinder 7, acts to protract the hydraulic cylinder 7 due to a slight loss of pressure balance. This may be repeated frequently in a short period of time. However, the provision of the non-control areas in the third embodiment avoids this.

The stroke ranges may be set independently for the front wheels and the rear wheels.

Figure 13:
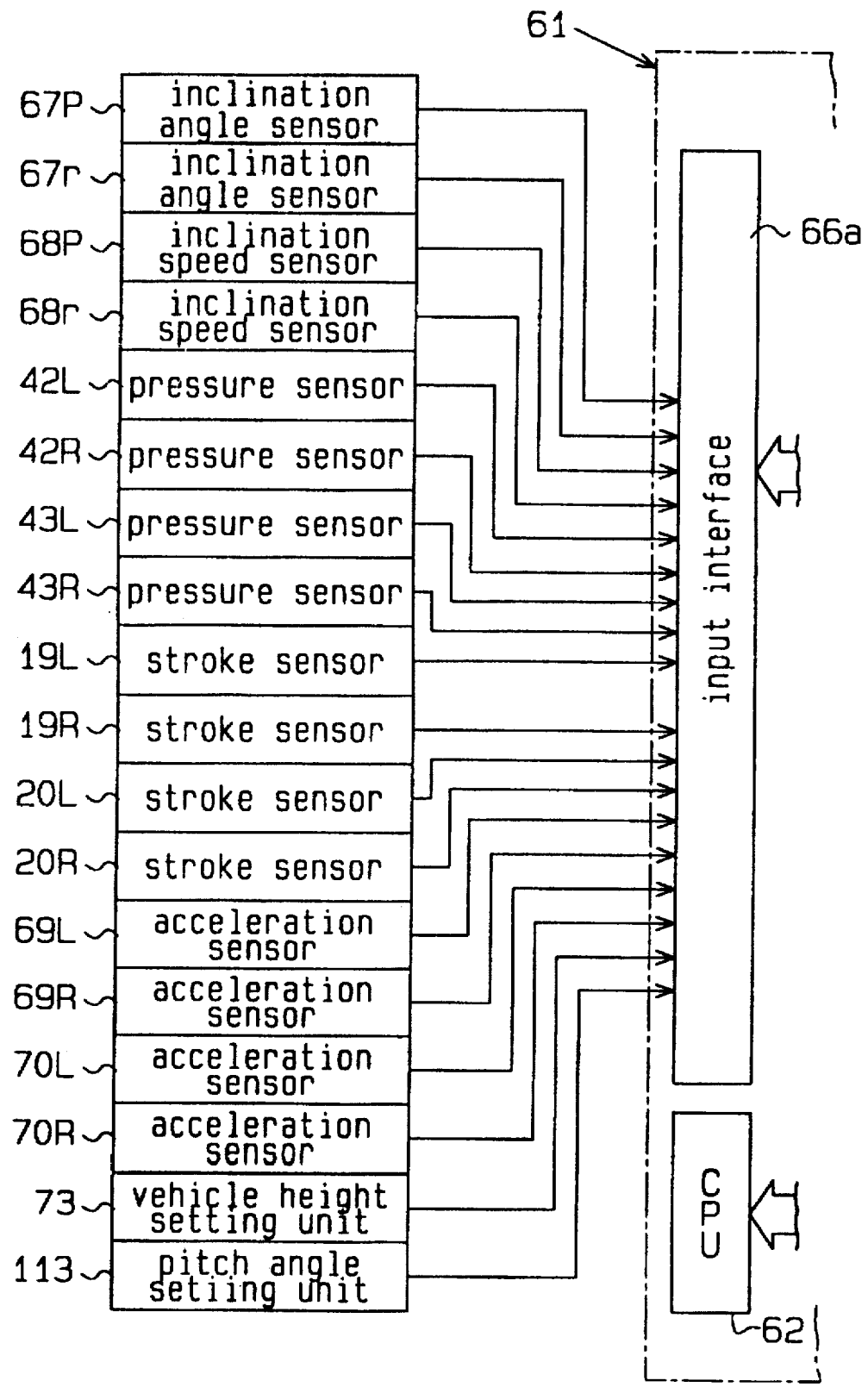
FIG. 13 is a block circuit diagram showing a part of the electric structure of a fourth embodiment.
Figure 14:
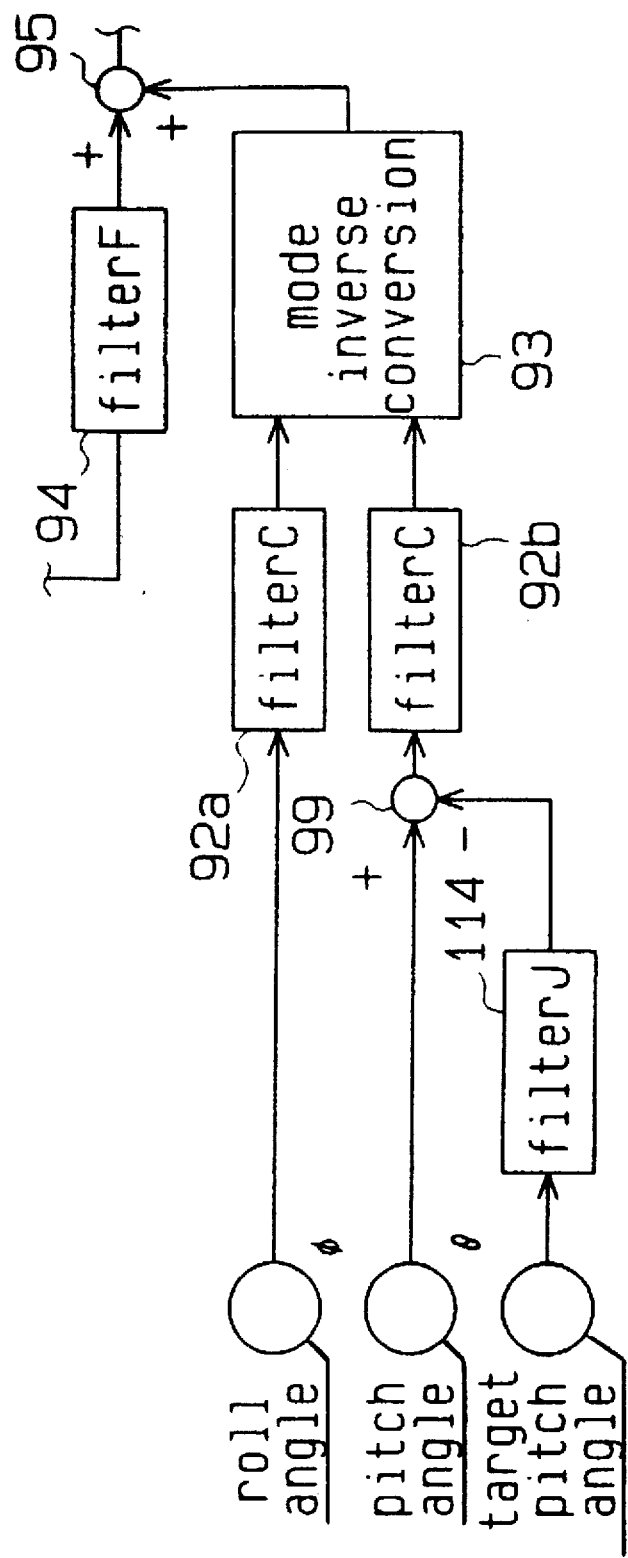
FIG. 14 is a block diagram showing a part of a control system according to the fourth embodiment.

A fourth embodiment will now be described with reference to FIGS. 13 and 14. This embodiment differs from the above-described embodiments in that when the vehicle 1 drives down a sharp slope, the state control is performed to set the vehicle body not horizontal but inclined slightly in the downward direction. FIG. 13 is a block diagram partially showing the electric circuit, and FIG. 14 is a block diagram showing a part of the control system. The electric circuit of this embodiment is the electric circuit of the third embodiment from which both stroke range setting units 112a and 112b are omitted and to which a pitch angle setting unit 113 is added.

With regard to the block diagram of the control system, the filter G87, lateral acceleration computing unit 88, filter H89, roll angle compensation unit 90, adder 91, filter I97 and pitch angle compensation unit 98, which are needed to compensate the lateral acceleration and the forward/backward acceleration, are omitted from the control system of the first embodiment as given in the block diagram in FIG. 7. Further, the adder 105, low-pass filter 106, vehicle height compensation discriminating unit 107 and vehicle height compensation unit 108 are omitted, and a filter J114 constituted of a low-pass filter is added. The pitch angle setting unit 113 is located for easy manipulation from the driver's seat. The pitch angle setting unit 113 has a turnable knob and produces a set signal for setting the pitch angle θ of the vehicle body in proportion to the position of the knob.

When the vehicle 1 drives off-road in an area other than a sharp slope, the pitch angle setting unit 113 sets the target pitch angle to zero. The state control is performed basically in the same manner as in the first embodiment, except for the difference in the process up to the point of inputting the pitch angle θ and roll angle φ detected by the inclination angle sensors 67p and 67r to the mode inverse conversion unit 93. In other words, after receiving the output signals of the vehicle height setting unit 73 and pitch angle setting unit 113, the CPU 62 computes the control amount for each hydraulic cylinder 7.

The target pitch angle θ set by the pitch angle setting unit 113 is input via the filter J114 to the adder 99 to be added to the pitch angle θ detected by the inclination angle sensor 67p. Then, the added result is sent via a filter C92b to the mode inverse conversion unit 93. The filter J114 and the adder 99 constitute reference plane altering means. As a result, the reference plane at the time of computing the control amount of each hydraulic cylinder 7 becomes, not an absolute imaginary horizontal plane, but a plane inclined by the target pitch angle θ with respect to the imaginary horizontal plane. The CPU 62 computes the control amount of each hydraulic cylinder 7 with that inclined plane as a reference in the same manner as done in the case where the absolute imaginary horizontal plane is taken as a reference. Then, the instruction voltage values corresponding to the control amounts are sent to the servo valves 29L, 29R, 30L and 30R. Consequently, by performing the state control to keep the vehicle body horizontal, the vehicle body is controlled to be inclined downward in the frontward direction by the target pitch angle θ when the vehicle drives down a sharp slope.

It is therefore easier for the driver to check the forward road conditions near the vehicle 1 when driving down a sharp slope as compared with the case where the vehicle body is always kept horizontal. Further, it is possible to execute the ordinary state control with the absolute imaginary horizontal plane as a reference by setting the target pitch angle θ to zero using the pitch angle setting unit 113.

A fifth embodiment of this invention will now be discussed mainly with respect to its differences from the above-described embodiments. The work memory 64 of this embodiment is backed up by a backup power supply (not shown) so that data will not be erased even when the engine 21 is deactivated. The data stored in the program memory 63 include a map showing the relation between the instruction voltages to the servo valves and the protraction and retraction amounts of the hydraulic cylinders 7 and a map showing the relation between the detection signals from the stroke sensors 19L, 19R, 20L and 20R and the lengths of the hydraulic cylinders 7.

An ignition switch 120 shown in FIG. 1 is connected to the CPU 62 via the bus 65 and the input interface circuit 66a.

The vehicle height setting unit 73 shown in FIG. 1 may be of a digital type which digitally shows the set vehicle height so that changing the displayed digital numeral can alter the vehicle height. In this case, the user can recognize the vehicle height from the road surface by a numeral. Further, the vehicle can surely go over an obstruction if the height of the obstruction is measured with the eye and the numeral greater than the measured value is input. This method can quickly set the proper vehicle height to go over the obstruction.

The ignition switch 120 serves to detect the start and stop of the engine 21. When the ignition switch 120 outputs a predetermined signal to the CPU 62, the CPU 62 detects that the engine 21 has activated. At this time, the CPU 62 receives the output signal from the vehicle height setting unit 73 and computes the target vehicle height based on that signal.

In this embodiment, as in the above-described embodiments, the protraction/retraction amounts of the individual hydraulic cylinders 7 necessary to set the vehicle body horizontal and at the target vehicle height are obtained and their associated instruction voltage values to the servo valves 29L, 29R, 30L and 30R are computed. The instruction voltages are set to constant and relatively low values in order to perform the vehicle attitude control gradually.

When the vehicle height becomes horizontal and reaches the target vehicle height, the CPU 62 stops controlling the individual servo valves 29L, 29R, 30L and 30R. Then, the CPU 62 performs compensation to replace the output signals of the acceleration sensors 69L, 69R, 70L and 70R and the output signals of the pressure sensors 42L, 42R, 43L and 43R with the reference signal.

Thereafter, when the state of the vehicle body changes, changing the output signals of the inclination speed sensors 68p, 68r, the acceleration sensors 69L, 69R, 70L and 70R and the pressure sensors 42L, 42R, 43L and 43R, the offset values of the output signals from the reference signal are obtained to compensate for the state of the vehicle body.

Figure 15:
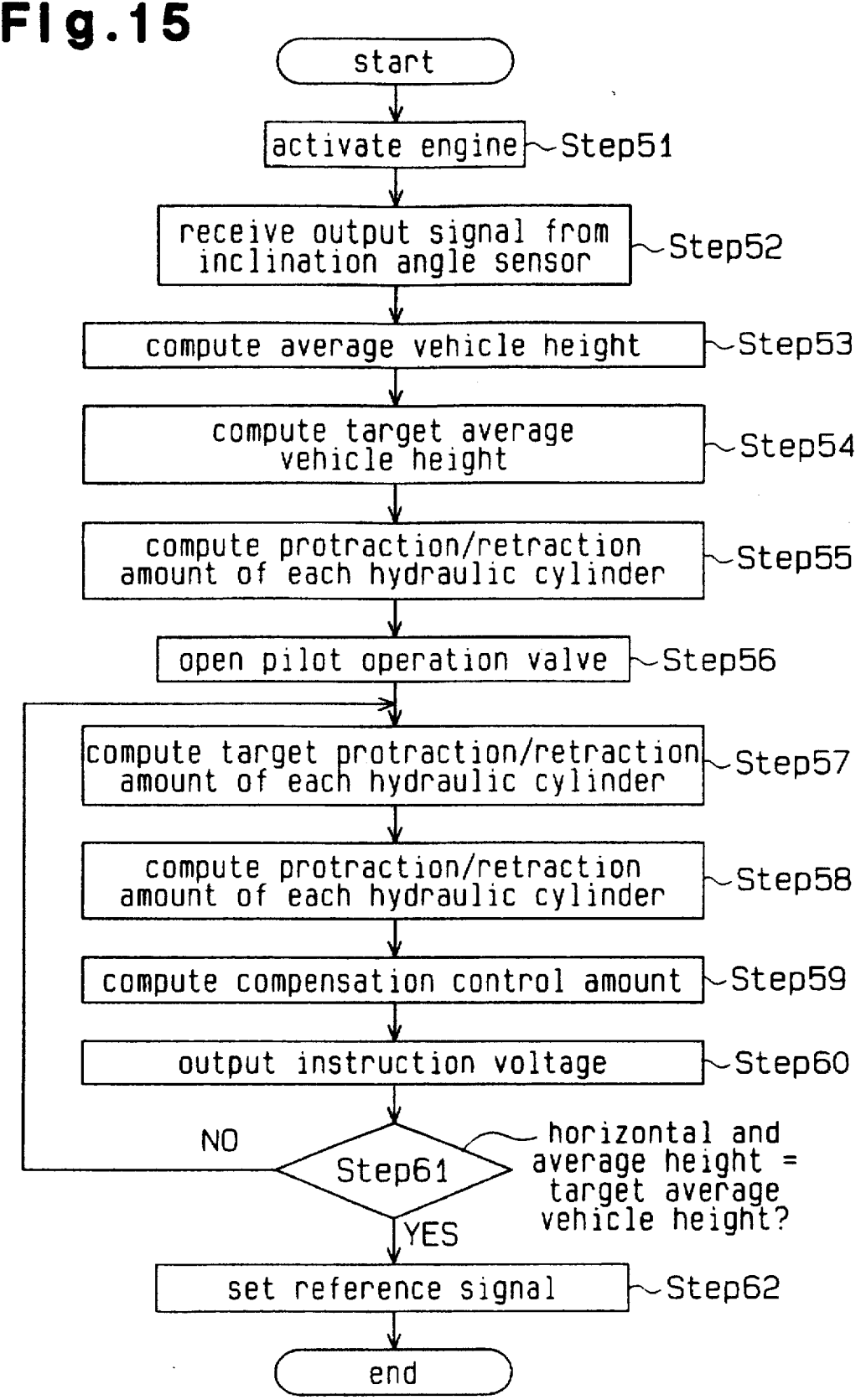
FIG. 15 is a flowchart for explaining the function of a state control apparatus according to a fifth embodiment.

The operation of the vehicle attitude control apparatus 61 of this embodiment will now be described with reference to the flowchart given in FIG. 15.

For the vehicle 1 to run off-road, the engine is activated.

Then, the signal indicating the activation of the engine is input to the CPU 62 from the ignition switch 120 (step 51). Since the pilot operation check valve 37 is closed then, the state of the vehicle body does not change. The CPU 62 then reads the output signals about the pitch angle θ and the roll angle φ from the inclination angle sensors 67p and 67r (step 52). Then, the CPU 62 computes the vehicle height of the vehicle body based on the output signals of the stroke sensors 19L, 19R, 20L and 20R (step 53). The CPU 62 also computes the target vehicle height based on the output signal of the vehicle height setting unit 73 (step 54).

Based on the output signals of the inclination angle sensors 67p and 67r, the CPU 62 computes the protraction or retraction amounts of the individual hydraulic cylinders 7 to set the vehicle body horizontal (step 55). Then, the CPU 62 controls the cutoff valve 31 to open the pilot operation check valve 37 (step 56). Subsequently, the CPU 62 computes the instruction voltage values to the servo valves 29L, 29R, 30L and 30R in accordance with the protraction/retraction amounts of the individual hydraulic cylinders 7 obtained in step 55, and outputs them to the servo valves 29L, 29R, 30L and 30R. Consequently, the operation fluid is supplied to or discharged from the hydraulic cylinders 7, causing the hydraulic cylinders 7 to protract or retract, i.e., causing the front and rear suspension systems 3 and 4 to protract or retract. As a result, the vehicle body is controlled to be horizontal.

The CPU 62 computes how much each hydraulic cylinder 7 should protract or retract to keep the vehicle body horizontal and set the vehicle height at the target vehicle height. That is, the target protraction or retraction amount is computed (step 57).

Next, the CPU 62 computes the current protraction or retraction amounts of the individual hydraulic cylinders 7 based on the output signals of the stroke sensors 19L, 19R, 20L and 20R (step 58). The CPU 62 then computes the compensation control amount to set the difference between each current protraction or retraction amount, attained in step 58, and the associated target protraction or retraction amount, attained in step 57, to zero or set both amounts equal to each other (step 59). Subsequently, the CPU 62 computes the instruction voltage values to the servo valves 29L, 29R, 30L and 30R in accordance with the compensation control amounts, and sends those values to the associated servo valves 29L, 29R, 30L and 30R (step 60). Accordingly, the state control is performed so that the vehicle body becomes horizontal and the vehicle height reaches the target vehicle height.

Next, the CPU 62 determines if the vehicle body is horizontal based on the output signals from the inclination angle sensors 67p and 67r and determines if the vehicle height has reached the target vehicle height based on the output signals of the stroke sensors 19L, 19R, 20L and 20R (step 61). When those conditions are not met, the CPU 62 returns to step 57 and repeats the above-described control.

When the conditions in step 61 are satisfied, on the other hand, the CPU 62 terminates the state control and stores the output signals of the acceleration sensors 69L, 69R, 70L and 70R and the pressure sensors 42L, 42R, 43L and 43R as reference signals in the work memory 64 (step 62).

The state control of the vehicle body thereafter is performed based on the displacement amounts obtained by comparing the reference signals and output signals of the inclination speed sensors 68p and 68r and the acceleration sensors 69L, 69R, 70L and 70R with each other and the displacement amounts obtained by comparing the reference signals and output signals of the pressure sensors 42L, 42R, 43L and 43R with each other.

When the engine 21 is activated, therefore, the vehicle attitude control apparatus 61 can keep the vehicle body horizontal and can set the vehicle height equal to the target vehicle height. At this time, the output signals of the inclination speed sensors 68p and 68r, the acceleration sensors 69L, 69R, 70L and 70R and the pressure sensors 42L, 42R, 43L and 43R are set as reference signals. When the state of the vehicle body changes during the later driving of the vehicle 1 and the output signals of the inclination speed sensors 68p and 68r and the acceleration sensors 69L, 69R, 70L and 70R change, the state of the vehicle body can be controlled based on the displacement amount between each reference signal and the associated output signal.

Likewise, when the output signals of the pressure sensors 42L, 42R, 43L and 43R change due to a change in the state of the vehicle body, the state of the vehicle body can be controlled based on the displacement amounts between each reference signal and the associated output signal. What is more, since all the output signals of the inclination speed sensors 68p and 68r, the acceleration sensors 69L, 69R, 70L and 70R and the pressure sensors 42L, 42R, 43L and 43R can be set as reference signals in the fifth embodiment, the state of the vehicle body can be controlled more appropriately. Further, even if the vehicle 1 has been inclined when the vehicle 1 is activated, the state control can be performed to set the vehicle 1 horizontal.

In this embodiment, instead of setting all the output signals of the inclination speed sensors 68p and 68r, the acceleration sensors 69L, 69R, 70L and 70R and the pressure sensors 42L, 42R, 43L and 43R as reference signals, the output signal of an arbitrary sensor may be selectively set as a reference signal. In addition, the pressure sensors 42L, 42R, 43L and 43R may be omitted as needed.

A sixth embodiment will now be described. The basic structure of the vehicle attitude control apparatus 61 in this embodiment is the same as that of the fifth embodiment, but its function differs. The differences will be discussed below with reference to FIG. 1.

When the engine 21 is stopped, the CPU 62 of the vehicle attitude control apparatus 61 stops producing a signal in accordance with the signal from the ignition switch 120. The CPU 62 writes the target vehicle height based on the output signal of the vehicle height setting unit 73 at the time the engine 21 is stopped into the work memory 64 as the target vehicle height before the activation of the engine (hereinafter referred to as "preactivation target vehicle height").

When the engine 21 is activated again, the CPU 61 determines whether or not the target vehicle height computed based on the output signal of the vehicle height setting unit 73 is equal to or smaller than the preactivation target vehicle height stored previously in the work memory 64. When determining that the target vehicle height is equal to or smaller than the preactivation target vehicle height, the CPU 62 executes the state control of the vehicle body based on the preactivation target vehicle height. When determining that the target vehicle height is equal or greater than the preactivation target vehicle height, the CPU 62 executes the state control of the vehicle body based on the target vehicle height.

Figure 16:
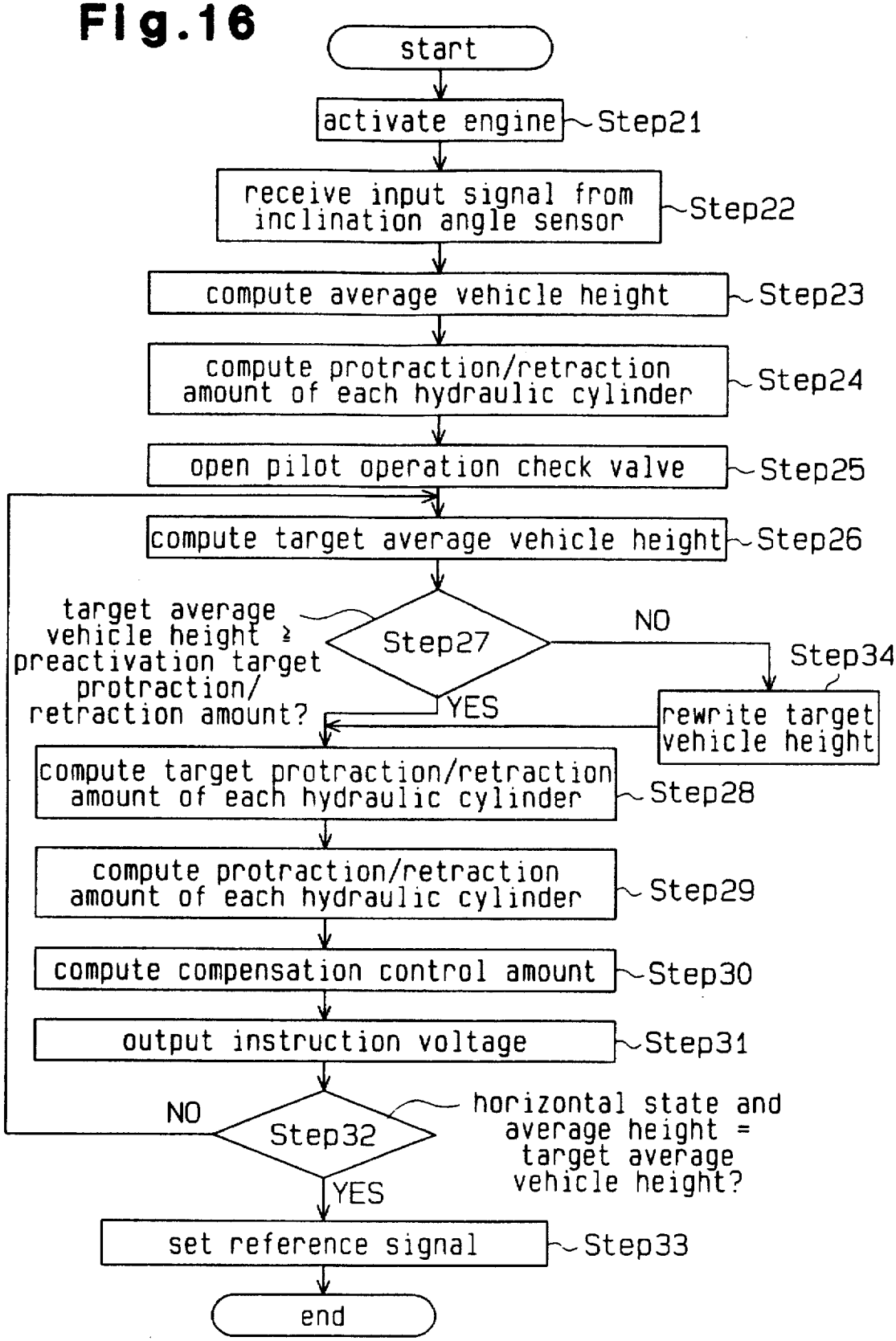
FIG. 16 is a flowchart for explaining the function of a state control apparatus according to a sixth embodiment.

The operation of the vehicle attitude control apparatus 61 will now be described with reference to the flowchart given in FIG. 16.

When the engine is activated for the vehicle 1 to run off-road, the ignition switch 120 outputs a predetermined signal (step 21). Since the pilot operation check valve 37 is closed then, the state of the vehicle body does not change. The CPU 62 then reads the output signals about the pitch angle θ and the roll angle φ from the inclination angle sensors 67p and 67r (step 22). Then, the CPU 62 reads the output signals of the stroke sensors 19L, 19R, 20L and 20R and computes the vehicle height of the vehicle body (step 23).

Based on the output signals of the inclination angle sensors 67p and 67r, the CPU 62 computes the protraction or retraction amounts of the individual hydraulic cylinders 7 to set the vehicle body horizontal (step 24). Then, the CPU 62 controls the cutoff valve 31 to open the pilot operation check valve 37 (step 25). Subsequently, the CPU 62 computes the instruction voltage values to the servo valves 29L, 29R, 30L and 30R associated with the protraction/retraction amounts of the individual hydraulic cylinders 7 obtained in step 24, and sends them to the servo valves 29L, 29R, 30L and 30R. Consequently, the operation fluid is supplied to or discharged from the hydraulic cylinders 7, causing the hydraulic cylinders 7 to protract or retract, i.e., causing the front and rear suspension systems 3 and 4 to protract or retract. As a result, the vehicle body is controlled to be horizontal.

The CPU 62 computes the target vehicle height based on the output signal of the vehicle height setting unit 73 (step 26). Next, the CPU 62 reads the preactivation target vehicle height from the work memory 64, and determines if the target vehicle height is equal to or smaller than the preactivation target vehicle height (step 27). When determining that the target vehicle height is equal to or greater than the preactivation target vehicle height, the CPU 62 proceeds to step 28.

In step 28, the CPU 62 computes the target protraction or retraction amount for each hydraulic cylinder 7 necessary to keep the vehicle body horizontal and set the vehicle height at the target vehicle height. The CPU 62 computes the current protraction or retraction amounts of the individual hydraulic cylinders 7 based on the output signals of the stroke sensors 19L, 19R, 20L and 20R (step 29). The CPU 62 then computes the compensation control amount to set the difference between each current protraction or retraction amount, attained in step 29, and the associated target protraction or retraction amount, attained in step 28, to zero or set both amounts equal to each other (step 30). Subsequently, the CPU 62 computes the instruction voltage values to the servo valves 29L, 29R, 30L and 30R in accordance with the compensation control amounts, and sends those values to the associated servo valves 29L, 29R, 30L and 30R (step 31). Accordingly, the state control is performed so that the vehicle body becomes horizontal and the vehicle height reaches the target vehicle height.

Next, the CPU 62 determines if the vehicle body is horizontal based on the output signals from the inclination angle sensors 67p and 67r and determines if the vehicle height has reached the target vehicle height based on the output signals of the stroke sensors 19L, 19R, 20L and 20R (step 32). When those conditions are not met, the CPU 62 returns to step 26 and repeats the above-described control.

When the conditions in step 32 are satisfied, on the other hand, the CPU 62 terminates the state control and stores the output signals of the acceleration sensors 69L, 69R, 70L and 70R and the pressure sensors 42L, 42R, 43L and 43R as reference signals in the work memory 64 (step 33).

The state control of the vehicle body thereafter is performed based on the displacement amounts obtained by comparing the reference signals and output signals of the acceleration sensors 69L, 69R, 70L and 70R with each other and the displacement amounts obtained by comparing the reference signals and output signals of the pressure sensors 42L, 42R, 43L and 43R with each other.

If the CPU 62 determines in step 27 that the target vehicle height is less than the preactivation target vehicle height, the program proceeds to step 34. The CPU 62 then replaces the preactivation target vehicle height with the target vehicle height and moves to step 28 to perform the above-described processing. When the target vehicle height is determined to be smaller than the preactivation target vehicle height, therefore, the state control to set the vehicle body horizontal and the state control to set the vehicle height to the preactivation target vehicle height are executed.

The vehicle height, before the activation, is set to a value that allows the vehicle to go over an obstruction on a road. If the target vehicle height set by the vehicle height setting unit 73 is set equal to or greater than the preactivation target vehicle height, therefore, the vehicle 1 can start going over an obstruction, even if the obstruction is under the vehicle body at the time the vehicle 1 starts, without interference. If the vehicle height setting unit 73 is accidentally manipulated while the vehicle 1 is stopped, setting the vehicle height lower than the one before the stopping of the vehicle 1, the vehicle height set by the vehicle height setting unit 73 at the time of stopping the vehicle 1 has already been stored in the memory. When the vehicle 1 is activated again, therefore, the vehicle height can be set higher than the one before the stopping of the vehicle 1. This allows the vehicle 1 to safely start without interfering with the obstruction present on the road.

Further, after the engine 21 is activated, the vehicle attitude control apparatus 61 keeps the vehicle body horizontal and sets the vehicle height equal to the target vehicle height or the preactivation target vehicle height as described above. At this time, the output signals of the acceleration sensors 69L, 69R, 70L and 70R and the pressure sensors 42L, 42R, 43L and 43R are set as reference signals. As a result, when the state of the vehicle body changes during the later driving of the vehicle 1 and the output signals of the acceleration sensors 69L, 69R, 70L and 70R change, the state of the vehicle body can be controlled based on the displacement amount between each reference signal and the associated output signal. Likewise, when the output signals of the pressure sensors 42L, 42R, 43L and 43R change due to a change in the state of the vehicle body, the state of the vehicle body can be controlled based on the displacement amount between the reference signal and the associated output signal of each sensor.

This sixth embodiment allows the vehicle 1 to start without interfering with an obstruction present under the vehicle body at the starting time. Further, the output signals of the pressure sensors 42L, 42R, 43L and 43R can also be set as reference signals, so that the state of the vehicle body can be controlled more accurately.

In the sixth embodiment, when the engine 21 is stopped, the target vehicle height set by the vehicle height setting unit 73 is stored in the work memory 64. This embodiment may be modified so that when the engine 21 is stopped, the CPU 62 computes the vehicle height based on the output signals of the stroke sensors 19L, 19R, 20L and 20R, writes this vehicle height as the preactivation target vehicle height in the work memory 64, and sets the vehicle height based on the stored preactivation target vehicle height and the target vehicle height.

The pressure sensors 42L, 42R, 43L and 43R may be omitted as needed.

The vehicle attitude control apparatus 61 may be structured as follows. After the engine 21 is activated, the CPU 62 computes the vehicle height before control based on the output signals of the stroke sensors 19L, 19R, 20L and 20R before the pilot operation check valve 37 opens. Then, the CPU 62 computes the protraction/retraction amounts of the individual hydraulic cylinders 7 for setting the vehicle body horizontal. Thereafter, the CPU 62 controls the cutoff valve 31 to open the pilot operation check valve 37 to set the vehicle body horizontal.

Next, the CPU 62 computes the target vehicle height based on the output signal of the vehicle height setting unit 73 and determines if this target vehicle height is equal to or smaller than the precontrol vehicle height. When the target vehicle height is equal to or greater than the precontrol vehicle height, the CPU 62 protracts or retracts the individual hydraulic cylinders 7 so as to set the vehicle body horizontal and obtain the target vehicle height. When the target vehicle height is smaller than the precontrol vehicle height, the target vehicle height is replaced with the precontrol vehicle height and the protraction/retraction of the individual hydraulic cylinders 7 is controlled based on the new target vehicle height. Then compensation is performed in such a manner that when the vehicle body becomes horizontal and the vehicle height reaches the target vehicle height or the precontrol vehicle height, the output signals of the acceleration sensors 69L, 69R, 70L and 70R and the pressure sensors 42L, 42R, 43L and 43R become reference signals.

When the output signals of the acceleration sensors 69L, 69R, 70L and 70R change due to a change in the state of the vehicle body, the state of the vehicle body can be controlled based on the displacement amount between each reference signal and the associated output signal. Therefore, even if the vehicle body has been inclined before the start of the engine, the state control can be performed accurately to set the vehicle body horizontal. It is unnecessary to store the target vehicle height set by the vehicle height setting unit 73 in the work memory 64 when the engine 21 is stopped. This can eliminate the need for the backup power supply for holding stored data, thus simplifying the structure of the vehicle attitude control apparatus 61.

The sixth embodiment performs compensation in such a manner that the output signals of the acceleration sensors 69L, 69R, 70L and 70R and the pressure sensors 42L, 42R, 43L and 43R become reference signals in step 33. However, if, at the time the engine is activated, it is simply necessary to maintain the vehicle height before the activation of the engine and to start the vehicle 1 with the vehicle body set horizontal, the step 33 can be omitted. In this case, the process should be terminated immediately when the conditions in step 32 are satisfied.

The outputs of the acceleration sensors 69L, 69R, 70L and 70R are put through the integrator to be used to obtain the displacement speed of each wheel. If the temperature changes, however, the outputs of the acceleration sensors 69L, 69R, 70L and 70R may also change. This error factor may interfere with the accurate state control. According to this embodiment, therefore, when the vehicle body is set horizontal and at the target vehicle height after the start of the engine, the outputs of the acceleration sensors 69L, 69R, 70L and 70R are stored as the reference signals. It is therefore possible to accurately perform the state control thereafter using the reference signals.

The pressure sensors 42L, 42R, 43L and 43R produce signals corresponding to the loads of the individual wheels and the state control of the vehicle is carried out in such a way that the offsets of those signals from the reference signals become zero. Before and after the activation of the engine, the loading condition of the vehicle, e.g., the load in the vehicle may change. Since the outputs of the pressure sensors 42L, 42R, 43L and 43R are stored as the reference signals when the vehicle body is set horizontal at the target vehicle height after the start of the engine, the state control is executed accurately even if the loading condition is changed.

The present invention is not limited to the above-described embodiments, but may be embodied in the following forms.

(1) For detecting a change in the inclination angle of a vehicle body from the horizontal state, instead of three types of sensors (acceleration sensor, inclination speed sensor and inclination angle sensor), a combination of two types of sensors, namely the acceleration sensor and inclination speed sensor, the acceleration sensor and inclination angle sensor or the inclination speed sensor and inclination angle sensor, or only one inclination speed sensor or one inclination angle sensor may be used.

(2) In the first embodiment, an acceleration sensor for detecting the forward/backward acceleration may be provided instead of computing the forward/backward acceleration from the vehicle speed.

(3) Another sensor capable of measuring the moving distance of the vehicle 1 may be used instead of computing the moving distance of the vehicle 1 from the signal from the vehicle speed sensor 72 at the time the vehicle passes over an obstruction after the obstruction sensor 71 detects the obstruction. The vehicle height may be automatically adjusted high when the obstruction sensor 71 detects an obstruction. In this case, a vehicle-height adjustment release button should be provided at the driver's seat so that when the driver presses this button after the vehicle 1 passes over the obstruction, the vehicle height is set back to the target vehicle height being used before the detection of the obstruction.

(4) The vehicle height may be manually adjusted to go over an obstruction when the obstruction sensor 71 detects the obstruction. In this case, the control system has the structure of the control system of the first embodiment from which the adder 105, the low-pass filter 106, the vehicle height compensation discriminating unit 107 and the vehicle height compensation unit 108 are removed. When the obstruction sensor 71 detects an obstruction and the indication lamp 76 is lit, the driver should manipulate the vehicle height setting unit 73 in the direction to set the vehicle height high. The control apparatus 61 sends the instruction voltages to the respective servo valves to protract the individual hydraulic cylinders 7 so that the vehicle height becomes the target vehicle height newly set by the vehicle height setting unit 73. As a result, the vehicle height is set high. The driver adjusts the vehicle height setting unit 73 until the indication lamp 76 is turned off. Since the vehicle 1 can pass over the obstruction in this case too, the driver need not steer the vehicle so frequently thus simplifying the vehicle's operation driving. The select switch 74 may be omitted.

(5) As the informing means which is activated by the detection signal from the obstruction sensor 71, a buzzer may be used in place of the indication lamp 76. The obstruction detecting means is not limited to an ultrasonic sensor; a light emitting and receiving type sensor or an image sensor or the like may also be used.

(6) The fourth embodiment may be modified so that a minus pitch angle −θ can be set by the pitch angle setting unit 113. If a minus pitch angle −θ can be set by the pitch angle setting unit 113 when the vehicle 1 drives up a sharp slope, the state of the vehicle body is controlled to be inclined backward by −θ with respect to the horizontal plane. If the vehicle runs in the backward-inclined state when driving up on a sharp slope, the driver can easily check the front road condition near the vehicle 1 and the distant road conditions.

(7) The hydraulic cylinders 7 for protracting and retracting the suspension systems 3 and 4 may be arranged in parallel to the suspension systems 3 and 4 instead of being incorporated in the suspension systems 3 and 4. Alternatively, the stroke sensor may be replaced with other types than the one which is incorporated in the hydraulic cylinder 7.

(8) As the hydraulic pump 23, an inclined shaft type variable displacement hydraulic pump, a radial cylinder type variable displacement pump as disclosed in Japanese Unexamined Patent Publication No. Hei 5-164245, or another type may be used instead of the swash plate type variable displacement hydraulic pump. Alternatively, a hydraulic pump with a constant displacement may be used as the hydraulic pump 23. Further, as the driving source for the hydraulic pump, the engine may be replaced with a battery-operable motor.

(9) To drive the front wheels 12L and 12R and the rear wheels 14L and 14R, a battery-operable motor may be used in place of the hydraulic motor.

(10) A vehicle attitude control apparatus equipped with all the components of the first to fourth embodiments may be realized. Alternatively, the structures of the first to fourth embodiments may be combined as needed. For example, the following combinations may be taken.

The first and second embodiments.
The first and third embodiments.
The first and fourth embodiments.
The second and third embodiments.
The second and fourth embodiments.
The first, second and third embodiments.
The first, third and fourth embodiments.
The second, third and fourth embodiments.

(11) This invention may be adapted for use in a vehicle which is a front drive type or a rear drive type, in place of the four wheel drive type vehicle.

What is claimed is:

1. An attitude control apparatus for a vehicle, said vehicle having a body with a plurality of wheels supported by associated suspensions and an actuator operated by a fluid for expanding each suspension to control the stroke of each wheel, said apparatus comprising:

first detecting means for detecting a variation of incline of the body when the body inclines from a horizontal position of the body;

second detecting means for detecting a vertical position of each wheel relative to the body;

third detecting means for detecting a load applied to each wheel;

first control means for controlling a volume and a direction of the fluid to be supplied to the actuator;

calculating means for calculating a vertical displacement of each wheel, a current average height of the body, and a variation of the load of the wheel based on the variation of the inclined angle of the body, the vertical position of each wheel, and the load of each wheel;

setting means for setting a target value of the average height; and second control means for controlling the actuator via the first control means in response to results calculated by the calculating means to cause the current average height to approach the target value and to cause the variation of the load of each wheel to approach substantially zero.

2. An apparatus according to claim 1, wherein said actuator includes a hydraulic cylinder mounted on each suspension.

3. An apparatus according to claim 1, wherein said first detecting means includes one selected from a group consisting of a sensor for detecting an acceleration of the body, a sensor for detecting the inclined angle of the body, and a sensor for detecting a change velocity of the inclined angle.

4. An apparatus according to claim 1 further comprising means for restricting a stroke of the actuator in accordance with the stroke of each wheel.

5. An apparatus according to claim 1 further comprising:

fourth detecting means for detecting obstacles existing in front of the body and for transmitting a signal indicative of the presence of the obstacles; and changing means for changing the target value to a value greater than the current height in response to the signal from the fourth detecting means.

6. An apparatus according to claim 5 further comprising:

means for informing the presence of the obstacles in response to the signal from the fourth detecting means.

7. An apparatus according to claim 5 further comprising:

fifth detecting means for detecting a velocity of the body and for transmitting a signal indicative of the velocity; and means for calculating, according to the signal indicative of the velocity, a distance where the body moves between the initiation and the termination of transmitting the signal indicative of the presence of the obstacles;

wherein said actuator is controlled according to the calculated distance and the greater target value of the height.

8. An apparatus according to claim 1 further comprising:

means for selecting a mode where the attitude of the body is controlled and a mode where the attitude is not controlled, wherein said second control means controls the actuator in response to the selected mode.

9. An apparatus according to claim 1 further comprising:

means for setting the signal transmitted from at least one of the first detecting means and the third detecting means as a reference signal to be used for a subsequent calculation by the calculating means when the body approaches the horizontal position and the current average height approaches the target value.

10. An attitude control apparatus for a vehicle, said vehicle having a body with a plurality of wheels supported by associated suspensions and an actuator operated by a fluid for expanding each suspension to control the stroke of each wheel, said apparatus comprising:

an accumulator connected to the actuator;

first detecting means for detecting a variation of incline of the body when the body inclines from a horizontal position of the body and for transmitting a signal indicative of the inclined angle;

second detecting means for detecting a vertical position of each wheel relative to the body and for transmitting a signal indicative of the vertical position;

third detecting means for detecting a load applied to each wheel and for transmitting a signal indicative of the load;

first control means for controlling a volume and a direction of the fluid to be supplied to the actuator;

memory means for storing a feedback gain determined by use of an equation of state having state parameters including a vertical displacement of each wheel, the velocity of the vertical displacement and a pressure in the accumulator;

means for calculating the vertical displacement and the velocity of the vertical displacement based on the signal indicative of the inclined angle of the body, for calculating the pressure in the accumulator based on the signal indicative of the load, for calculating an average height of the body based on the signal indicative of the vertical position of the body, and for determining a manipulated variable based on the calculated results and the feedback gain;

setting means for setting a target value of the average height; and second control means for controlling the actuator via the first control means in response to the calculated results to cause the current average height to approach the target value and to cause the variation of the load of each wheel to approach substantially zero.

11. An apparatus according to claim 10, wherein said actuator includes a hydraulic cylinder mounted on each suspension.

12. An apparatus according to claim 10, wherein said first detecting means includes one selected from a group consisting of a sensor for detecting an acceleration of the body, a sensor for detecting the inclined angle of the body, and a sensor for detecting a change velocity of the inclined angle.

13. An apparatus according to claim 10 further comprising means for restricting a stroke of the actuator in accordance with the stroke of each wheel.

14. An apparatus according to claim 10 further comprising:

fourth detecting means for detecting obstacles existing in front of the body and for transmitting a signal indicative of the presence of the obstacles; and changing means for changing the target value to a value greater than the current height in response to the signal from the fourth detecting means.

15. An apparatus according to claim 14 further comprising:

means for reporting the presence of the obstacles in response to the signal from the fourth detecting means.

16. An apparatus according to claim 14 further comprising:

fifth detecting means for detecting a velocity of the body and for transmitting a signal indicative of the velocity; and means for calculating, according to the signal indicative of the velocity, a distance where the body moves between the initiation and the termination of the signal indicative of the presence of the obstacles;

wherein said actuator is controlled according to the calculated distance and the greater target value of the height.

17. An apparatus according to claim 10 further comprising:

means for selecting a mode where the attitude of the body is controlled and a mode where the attitude is not controlled, wherein said second control means controls the actuator in response to the selected mode.

18. An attitude control apparatus for a vehicle, said vehicle having a body with a plurality of wheels supported by associated suspensions and an actuator operated by a fluid for expanding each suspension to control the stroke of each wheel, said apparatus comprising:

first detecting means for detecting a variation of incline of the body when the body inclines from a horizontal position of the body;

second detecting means for detecting a vertical position 5 of each wheel relative to the body;

first control means for controlling a volume and a direction of the fluid to be supplied to the actuator;

setting means for setting a target value of the average height;

determining means for determining whether the target value is less than the average height prior to starting the vehicle;

first calculating means for calculating a displacement of each wheel with respect to the average height prior to starting the vehicle based on the variation of the inclined angle and for calculating a current average height based on the vertical position of each wheel when said determining means determines that the target height is less than the average height prior to starting the vehicle;

second calculating means for calculating a current average height based on the vertical position of each wheel and for calculating a displacement of each wheel with respect to the current average height based on the variation of the inclined angle when said determining means determines that the target height is over the average height prior to starting the vehicle; and second control means for controlling the hydraulic actuator via the first control means according to results calculated by the first and second calculating means.

19. An apparatus according to claim 18 further comprising:

third detecting means for detecting a load applied to each wheel; and means for setting the signal transmitted from at least one of the first detecting means and the third detecting means as a reference signal to be used for a subsequent calculation by the calculating means when the body approaches the horizontal position and the current average height approaches the target value.

* * * * *

UNITED STATES PATENT AND TRADEMARK OFFICE
CERTIFICATE OF CORRECTION

PATENT NO. : 5,684,698
DATED : November 4, 1997
INVENTOR(S) : Kazushi Fujii; Hisashi Kuriya; Kazuo Ishikawa; Yoshitaka Kouketsu; and Shunichi Shibasaki It is certified that error appears in the above-indentified patent and that said Letters Patent is hereby corrected as shown below:

Column 1, line 36, change "offour" to --of four--.

Column 9, line 18, change "de" to --dΦ--.

Column 12, line 19, change "differencebetween" to --difference between--.

Column 18, line 43, change "(Zi≤UL)" to --(Zi≤DL)--; line 44, change "(Vi>0)" to --(Vi<0)--.

Column 30, line 25, delete "5".

Signed and Sealed this

Twenty-eighth Day of April, 1998

Attest:

BRUCE LEHMAN

Attesting Officer

Commissioner of Patents and Trademarks